United States Patent [19]

Rastegar et al.

[11] Patent Number: 5,179,514
[45] Date of Patent: Jan. 12, 1993

[54] METHOD AND APPARATUS FOR TRAJECTORY CONTROL OF ROBOT MANIPULATORS OR THE LIKE

[75] Inventors: Jahangir S. Rastegar, Roslyn; Behruz Fardanesh, Chestnut Ridge, both of N.Y.

[73] Assignee: The Research Foundation of State University of New York, Albany, N.Y.

[21] Appl. No.: 564,633

[22] Filed: Aug. 8, 1990

[51] Int. Cl.⁵ .................... G06F 15/46; G05B 19/42
[52] U.S. Cl. ............................. 364/167.01; 364/174; 395/97; 395/85; 318/568.18; 318/568.22
[58] Field of Search ............. 364/167.01, 152, 157, 364/474.3, 174, 164, 165; 395/97, 88, 85, 89; 318/568.17, 568.18, 568.2, 568.22; 901/9, 2, 20

[56] References Cited

U.S. PATENT DOCUMENTS

| | | | |
|---|---|---|---|
| 3,812,474 | 5/1974 | Linn et al. | 318/569 |
| 4,152,765 | 5/1979 | Weber | 318/568 |
| 4,554,635 | 11/1985 | Levine | 364/191 |
| 4,556,833 | 12/1985 | Kishi et al. | 318/567 |
| 4,613,943 | 9/1986 | Miyake et al. | 364/513 |
| 4,617,623 | 10/1986 | Inoue et al. | 364/167.01 |
| 4,644,460 | 2/1987 | Kishi et al. | 364/191 |
| 4,744,039 | 5/1988 | Suzuki et al. | 364/513 |
| 4,789,931 | 12/1988 | Kuragano et al. | 364/474.18 |
| 4,807,153 | 2/1989 | Onaga et al. | 364/174 |
| 4,810,945 | 3/1989 | Yoneda et al. | 318/571 |
| 4,835,710 | 5/1989 | Schnelle et al. | 364/513 |
| 4,837,703 | 6/1989 | Kakazu et al. | 364/474.18 |
| 4,868,474 | 9/1989 | Lancraft et al. | 318/568.2 |
| 4,908,556 | 3/1990 | Daggett et al. | 318/568.2 |
| 4,925,312 | 5/1990 | Onaga et al. | 364/174 |
| 4,947,336 | 8/1990 | Froyd | 364/167.01 |

*Primary Examiner*—Jerry Smith
*Assistant Examiner*—Paul Gordon
*Attorney, Agent, or Firm*—Hoffmann & Baron

[57] ABSTRACT

A method and device for trajectory control of robot manipulators include selecting a trajectory pattern which corresponds to a desired trajectory which the robot manipulator is to follow. The trajectory pattern is in the form of a sinusoidal time function and a selected number of its harmonics. A signal generator generates a sinusoidal time-varying signal and selected harmonic signals. The signals are provided to a trajectory synthesizer and to a constant matrix gain stage. The trajectory synthesizer provides desired position and velocity vector signals, and the constant matrix gain stage provides a feedforward torque vector signal. First and second subtractors subtract actual position and velocity vector signals respectively from the desired position and velocity vector signals. The subtractors provide position and velocity error vector signals. The position and velocity error vector signals are amplified in respective first and second amplifiers or gain stages, and the amplified error vector signals are added together, along with the feedforward torque vector signal, in an adder to provide an actuation vector signal to drive the robot manipulator.

2 Claims, 12 Drawing Sheets

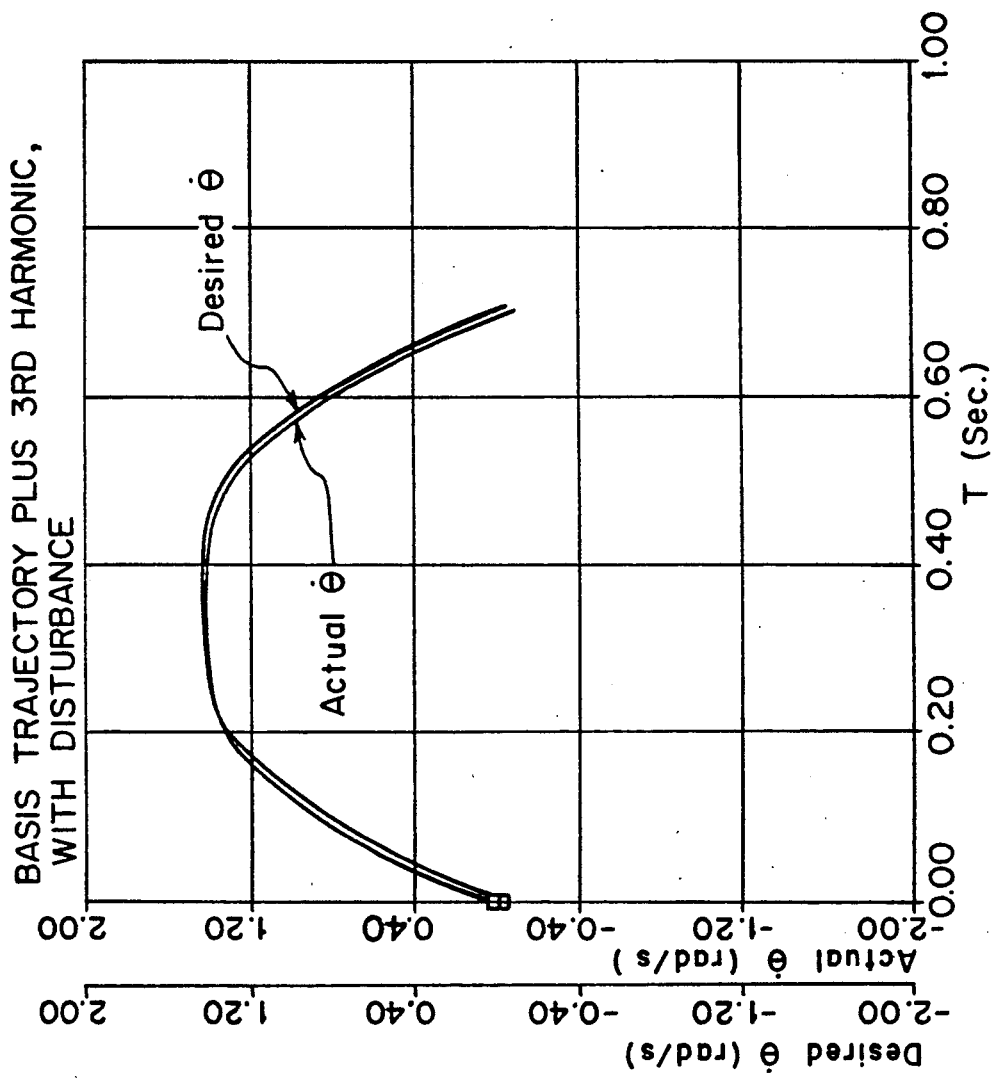

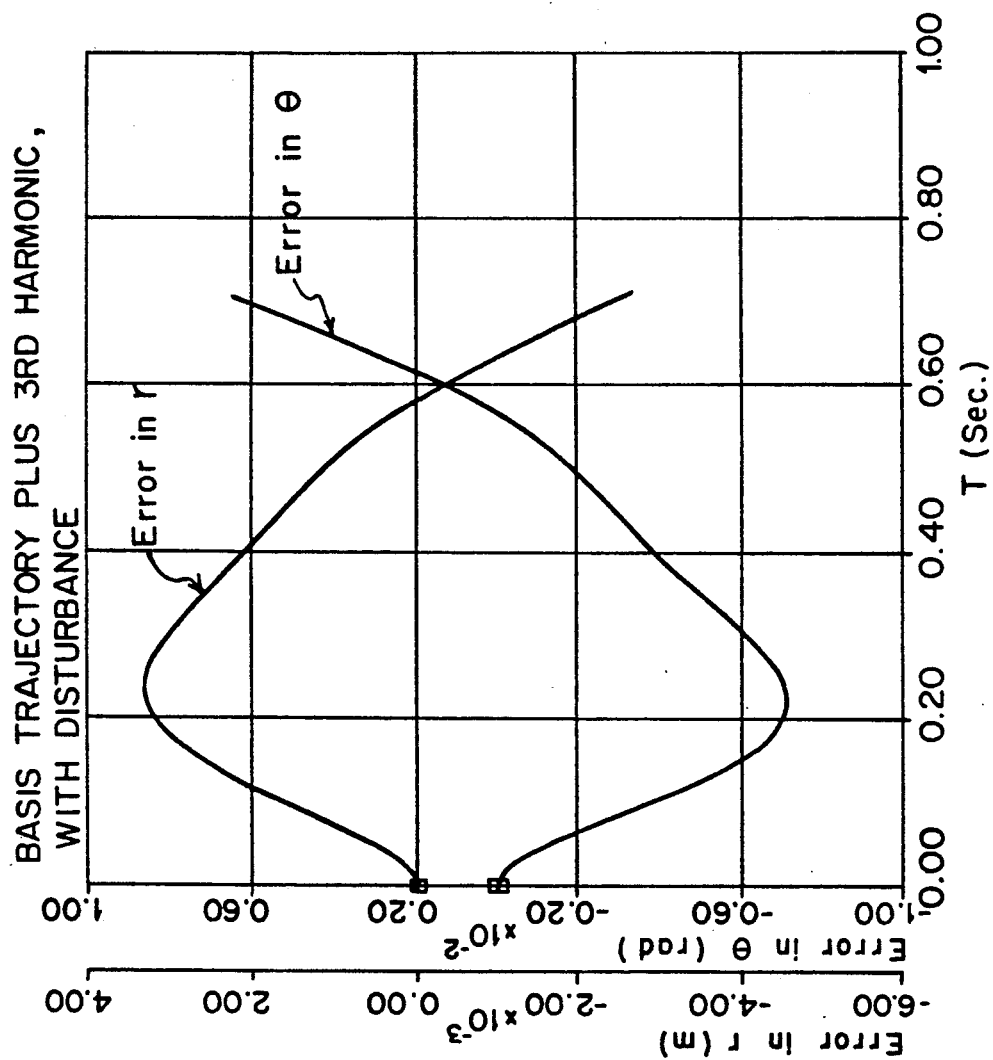

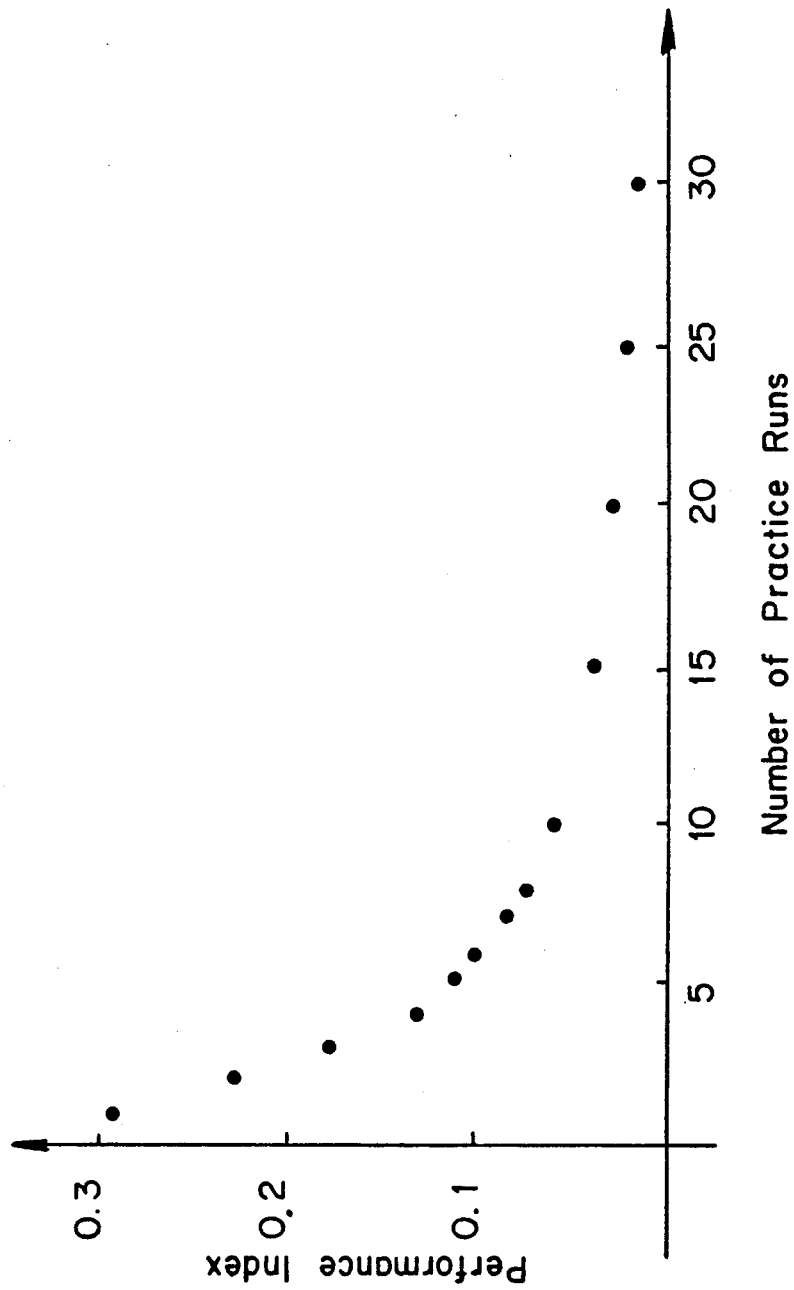

METHOD AND APPARATUS FOR TRAJECTORY CONTROL OF ROBOT MANIPULATORS OR THE LIKE

BACKGROUND OF THE INVENTION

1. Field of the Invention

This invention generally relates to a method and apparatus for trajectory control of robot manipulators or the, like, and more specifically relates to an inverse dynamics based robot controller and a method relating to the same.

2. Description of the Prior Art

The dynamic equations of motion of rigid-body robot manipulators have been derived using Lagrange-Euler equations, Newton-Euler equations, generalized d'Alembert equations, Recursive-Lagrange equations, and Kane's equations. A number of algorithms have also been developed to compute the equations of motion in numeric and symbolic forms. The development of inverse dynamics algorithms- for open-loop and closed-loop manipulators that are computationally efficient has been another area of intensive investigations. A number of researchers have proposed to "customize" the dynamics equations of manipulators in order to reduce the computational requirements.

Once the dynamic equations of motion are obtained, appropriate control laws or strategies must be determined in order to achieve the desired system response and performance. During the past two decades, the control problem has been studied extensively, and a number of schemes have been proposed. It is generally acknowledged that fixed-gain, linear controllers do not provide adequate dynamic performance at high speeds for multi-degrees-of-freedom robot manipulators. Of the numerous schemes investigated to date, those involving the calculation of the actuator torques (forces) using an inverse dynamics model of the manipulator (sometimes called the computed torque method), and those applying adaptive control techniques, have been extensively studied, and probably show the greatest promise.

Most conventional model based robot manipulator control methods use the inverse dynamics of the robot arm to produce the main torque (force) component necessary for trajectory tracking. This effectively renders the non-linear model of the robot manipulator linear, and a linear controller, usually PD (proportional+derivative) or PID (proportional+integral+derivative), is then used to provide any corrective torque (force) needed for tracking.

The conventional inverse dynamics based robot control methods have generally proven effective in reducing tracking errors in robot manipulators. However, the model based control methods currently available generally present three major drawbacks. Firstly, they all suffer from a heavy computational burden, and their real time implementation is only possible in a powerful computational environment. It is generally agreed that for high speed operation, the needed computational power for fast sampling rates desired in the control loops is still for the most part beyond the capabilities of today's microprocessors.

The second drawback of conventional model based control schemes is that the tracking accuracy is dependent on the accuracy with which the model parameters are determined. The model parameters have been shown to be difficult to be accurately determined, especially when kinematically complex manipulators are involved.

The third drawback is that the nonlinear dynamic model, particularly if used in a highly time-efficient form, is closely dependent on the manipulator being modeled and, therefore, the controller using this model requires significant modification in order to adapt to a different robot or to accommodate a new tool or payload.

OBJECTS AND SUMMARY OF THE INVENTION

It is an object of the present invention to provide a method and apparatus for trajectory control of robot manipulators or the like.

It is another object of the present invention to provide a universal inverse dynamics based robot controller capable of automatic reconfiguration for different classes of inverse dynamics, making the controller flexible, that is, permitting the same controller to be used for different robots or different non-linear dynamic systems.

It is a further object of the present invention to provide a method which eliminates the computations necessary in the real time tracking control of robot manipulators.

It is still another object of the present invention to provide a robot manipulator controller and method which is based on inverse dynamics models but which allows the higher harmonics appearing in the inverse dynamics models to be eliminated, thus allowing the use of simpler and more realistic inverse dynamics models.

It is a further object of the present invention to provide an inverse dynamic based robot controller having a structure which permits the use of analog and/or digital electronic components for its construction.

It is yet a further object of the present invention to provide a method and apparatus for trajectory control of robot manipulators or the like which is based on inverse dynamics models, where the model coefficients may be determined through a learning process, and where the coefficient values become more accurate through practice.

It is still another object of the present invention to provide a method and apparatus for robot trajectory control in which an off-line computation and storage or scheduling mode of operation can be adopted for a large number of trajectories without excessive memory requirements.

In accordance with the method of the present invention, the time history of motion along a prescribed path which the robot manipulator or the like is to follow is described by an appropriate sinusoidal time function and its harmonics. The trajectories so defined lead to inverse dynamics equations that are trajectory specific and in terms of the same sinusoidal time function and a number of its harmonics. The inverse dynamics models are grouped into classes of inverse dynamics models according to the harmonic content of their equations. The collection of all trajectories resulting in a certain class of inverse dynamics models is referred to as a trajectory pattern. For a given trajectory pattern, the structure of the inverse dynamics model is fixed. The model coefficients are constant for each particular trajectory.

More specifically, a method for trajectory control of robot manipulators or the like includes the steps of selecting a trajectory pattern which corresponds to a desired trajectory which the robot manipulator or the like is to follow. The trajectory pattern is in the form of a sinusoidal time function and a selected number of its harmonics. The desired trajectory has a starting point and an ending point, each of the starting point and ending point having associated with it position data, velocity data and acceleration data.

The position data, velocity data and acceleration data associated with each of the starting points and ending points are provided to a computational device. Also, data identifying the selected trajectory pattern is provided to the computational device.

The computational device calculates off-line predetermined constants associated with a trajectory synthesizer and predetermined coefficients associated with a constant matrix gain stage based on the selected trajectory pattern identifying data and the position data, velocity data and acceleration data associated with the starting and ending points.

The method further includes the step of generating a sinusoidal time-varying signal and selected harmonic signals of the sinusoidal signal. These signals are based on the selected trajectory pattern and respectively correspond to the sinusoidal time function and the selected number of harmonics of the sinusoidal time function.

The sinusoidal signal and the harmonic signals are provided to the trajectory synthesizer and the constant matrix gain stage. The trajectory synthesizer provides a desired position vector signal and a desired velocity vector signal as output signals from it. The constant matrix gain stage provides a feedforward torque vector signal as an output signal from it.

The robot manipulator or the like has sensors which provide an actual position vector signal and an actual velocity vector signal. The actual position vector signal is subtracted from the desired position vector signal, and the result is a position error vector signal.

The actual velocity vector signal is subtracted from the desired velocity vector signal, and the result is a velocity error vector signal.

The position error vector signal and the velocity error vector signal are amplified. The amplified position error vector signal and the amplified velocity error vector signal are added together along with the feedforward torque vector signal. This results in an actuation vector signal which is provided to the robot manipulator or the like to drive the robot manipulator.

In general, a robot can perform the majority of its required tasks through a limited number of trajectory patterns. Thus, the method of the present invention is practicable commercially. For arbitrary and complex paths and trajectories, a piecewise approximation of the path and the trajectory can be adopted, and the appropriate splicing measures can be taken.

The apparatus of the present invention basically includes an inverse dynamics based controller. The controller includes a function generator or the like for generating signals corresponding to the sinusoidal time function of the basis trajectory and its harmonics. The signals are provided to the trajectory synthesizer which generates the desired joint position and velocity vector signals using the sinusoidal and harmonic signals and the constant trajectory parameters of the trajectory synthesizer. The constant matrix gain stage multiplies the sinusoidal and harmonic signals by fixed gains (i.e., the coefficients of the matrix) to provide the robot actuator torques (i.e., the feedforward torque vector signal).

A computer, microprocessor or the like is also provided. The matrix coefficients of the constant matrix gain stage, the frequency of the fundamental sinusoidal function and its corresponding signals and the constants of the trajectory synthesizer are calculated by the computer and set.

The controller may also include an outer loop feedback control circuit to correct for model inaccuracies and noise. More specifically, the desired joint position and velocity vector signals are respectively provide to first and second subtractors. The output of each of the first and second subtractors is provided to a gain stage, whose outputs are also provided to an adder. The adder is a three input device which receives the amplified output signals of the first and second subtractors as well as the output of the constant matrix gain stage. The output of the adder is provided to the robot manipulator.

Sensors on the robot manipulator provide actual position and velocity vector signals. The actual position and velocity vector signals are respectively provided to the negative inputs of the first and second subtractors. The actual signals are subtracted from the desired signals, and a position error vector signal and a velocity error vector signal as a result of this subtraction are provided on the output of the first and second subtractors, respectively. These error signals are multiplied by the gain stages.

These and other objects, features and advantages of the present invention will be apparent from the following detailed description of illustrative embodiments thereof, which is to be read in connection with the accompanying drawings.

BRIEF DESCRIPTION OF THE DRAWINGS

FIGS. 9(a) and 9(b) respectively are graphs of the simulation results of the joint velocities of a robot manipulator following a second trajectory pattern in the presence of a disturbance.

FIGS. 9(c) and 9(d) are respectively graphs of the simulation results of joint position error and joint velocity error of a robot manipulator following the second trajectory pattern and in the presence of a disturbance.

FIG. 10 is a chart illustrating the improvements in the tracking performance of a robot manipulator controller formed in accordance with the present invention as the number of practice runs is increased.

DETAILED DESCRIPTION OF THE PREFERRED EMBODIMENTS

Figure 2:
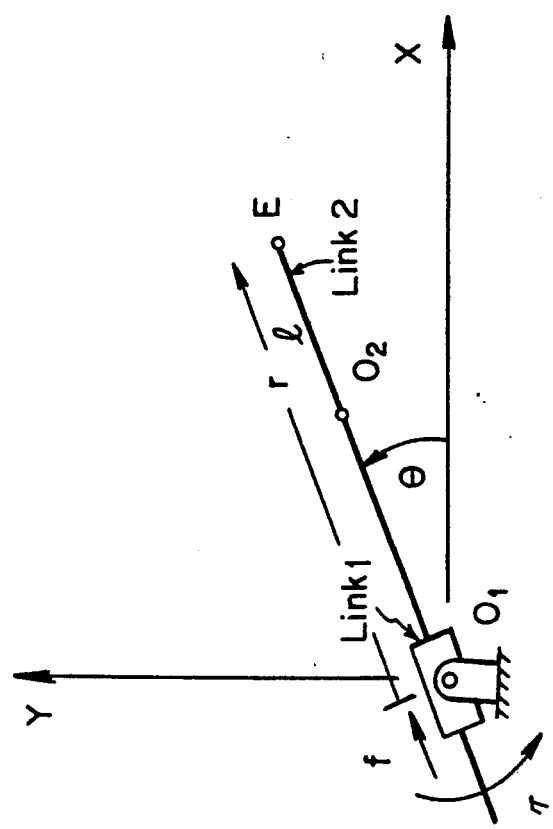
FIG. 2 is a two-dimensional graph illustrating a plane RP manipulator operating in the horizontal plane.

The method and apparatus of the present invention for trajectory control of robot manipulators or the like will now be described in detail. To facilitate an understanding of the invention, the derivation of the inverse dynamics models used in the method will also be described.

Basis Trajectory, Trajectory Patterns, and Classes of Inverse Dynamics Models To facilitate an understanding of the invention and the derivation of the principles upon which the method of the invention is based, first consider a sinusoidal time function with a period 2T. Let the acceleration of the end-effector of a robot manipulator along the path of motion be described as the product of a constant and the above sinusoidal function. The resulting trajectory will hereinafter be referred to as the "basis trajectory". General trajectories with continuous path and velocity profiles can then be approximated with the above sinusoidal time function (of the basis trajectory) and its harmonics. By substituting the trajectories thus defined into the equations of motion of a robot manipulator, the inverse dynamics equations (i.e., model) of the robot are obtained. The inverse dynamics models obtained using the above procedure will obviously be specific to the selected trajectories. In the following description, it will be shown that the derived inverse dynamics equations will also be in terms of the sinusoidal time function of the basis trajectory and its harmonics. The trajectories may be defined in the joint or the task (i.e., Cartesian) coordinate space.

For a given robot manipulator, let S be the set of all possible trajectories to be tracked. The inverse dynamics models corresponding to the set S of trajectories will be grouped into classes of inverse dynamics models in the following way. Each class of inverse dynamics models is expressed in terms of the sinusoidal time function of the basis trajectory and a different number of its harmonics.

Now let the subset $s_i$, $i = 1 \ldots n$ correspond to the class i of n inverse dynamics models. The collection of all trajectories resulting in the class i of the inverse dynamics models will hereinafter be referred to as the ith "trajectory pattern". The inverse dynamics models in a class differ only in the coefficients of the sinusoidal time functions that characterize that class.

For a given trajectory pattern, the structure of the inverse dynamics model is fixed. The model coefficients for a trajectory pattern are derived analytically in terms of the system and trajectory parameters. The coefficients are independent of time, and constant for each particular trajectory. When used for tracking control, the model coefficients are computed off-line for each particular trajectory. At the start of each motion, the values of the inverse dynamics model coefficients are set, and no real time computations will be necessary in the control loop.

Note that in the examples that will be described herein, only straight line paths with simple trajectories are used for simplicity. However, the method of the present invention can be readily extended to any arbitrary trajectory and path. For other simple paths and trajectories, direct analytical formulation is generally possible. For more complex situations one can, for example, divide the path into a number of segments, and approximate the trajectory along each segment with an appropriate sinusoidal time function and a suitable number of its harmonics. Appropriate splicing of the piecewise functions is, of course, required and can be done using well-known techniques.

The Inverse Dynamics Equations of a Robot Manipulator for Point-to-Point Motions At this point in the description of the invention, one should now consider a rigid-body, non-redundant, open-loop chain, n degrees-of-freedom robot manipulator. The equations of motion of the manipulator can be written in the following known form:

$$\Gamma = M(\Phi)\ddot{\Phi} + B(\Phi)[\dot{\Phi}\dot{\Phi}] + C(\Phi)[\dot{\Phi}^2] + G(\Phi) \tag{1}$$

where $\Phi$ is an $n+1$ joint variable vector or the position vector of the robot manipulator end-effector in the task (i.e., Cartesian) coordinates. The joint variable vector and the position vector in the task coordinates are related by the forward kinematic equations of the manipulator. $\Gamma$ is an $n \times 1$ actuator force (i.e., torque) vector, $M(\Phi)$ is an $n \times n$ inertia matrix, $B(\Phi)$ is an $n \times n(n-1)/2$ matrix of Coriolis coefficients, $[\dot{\Phi}\dot{\Phi}]$ is an $n(n-1)/2 \times 1$ vector of velocity products $$[\dot{\Phi}\dot{\Phi}] = [\dot{\phi}_1\dot{\phi}_2 \; \dot{\phi}_1\dot{\phi}_3 \ldots \dot{\phi}_{n-1}\dot{\phi}_n]^T \tag{2}$$

$C(\Phi)$ is an $n \times n$ matrix of centrifugal coefficients, $[\dot{\Phi}^2]$ is an $n \times 1$ vector $$[\dot{\Phi}^2] = [\dot{\phi}_1^2 \; \dot{\phi}_2^2 \ldots \dot{\phi}_n^2]^T \tag{3}$$

and $G(\Phi)$ is an $n \times 1$ vector of gravity terms. The actuator force (torque) constraints are given in the following form $$\Gamma_{i_{min}}(\Phi,\dot{\Phi}) \leq \Gamma_i \leq \Gamma_{i_{max}}(\Phi,\dot{\Phi}) \tag{4}$$

Figure 1:
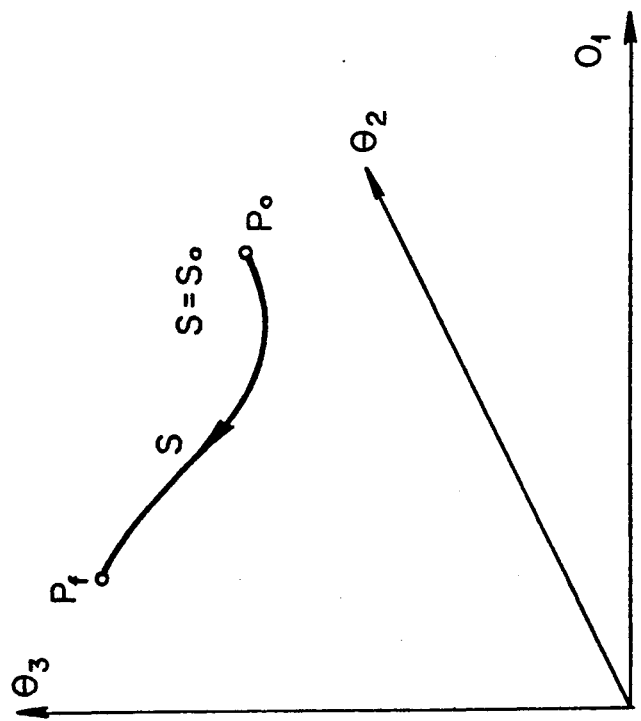
FIG. 1 is a three-dimensional graph showing the point to point movement of the end-effector of a robot manipulator.

Next, consider a point to point movement of the end-effector of the robot manipulator, as shown in FIG. 1, from the point $P_o$ to $P_f$ along the specified path. The variable to be used to describe the motion can be taken as s, where s is the distance traveled by the end-effector along the path from the point $P_o$. The equations of motion of the manipulator are thus described in terms of a single variable and its derivatives. The position of the end-effector can be written either in terms of the position vector as $r(\Phi)$, or as a function of the distance traveled along the path $q(s)$. Hence $$r(\Phi) = q(s) \tag{5}$$

Differentiating the above equation with respect to time yields $$[r_\Phi]\dot{\Phi} = q_s\dot{s} \tag{6}$$

where $q_s$ is a unit vector tangent to the path and $[r_\Phi]$ is a Jacobian matrix. At non-singular points, the Jacobian matrix can be inverted and thus $$\dot{\Phi} = [r_\Phi]^{-1}q_s\dot{s} \tag{7}$$

Similarly by differentiating the equation (7) with respect to time and inverting for non-singular points $$\ddot{\Phi} = [r_\Phi]^{-1}(q_{ss}\dot{s}^2 + q_{ss}\dot{s}^2 - [r_{\Phi\Phi}][\dot{\Phi}\dot{\Phi}] - [r_{\Phi 2}][\dot{\Phi}^2]) \quad (8)$$

where $q_{ss}$ is the second derivative of q with respect to s.
The matrix $[r_{\Phi\Phi}]$ has the terms $\delta^2 r_i/\delta\Phi_j\delta\Phi_k$, $j\neq k$.
The matrix $[r_{\Phi 2}]$ has the terms $\delta^2 r_i/\delta\Phi_j\delta\Phi_j$.
Now let the acceleration of the end-effector along the specified path be given as $$\ddot{s} = \sum_{m=1}^{l} k_m \cos\left(\frac{m\pi t}{T}\right) \quad (9)$$

where $k_m$, $m=1,2,\ldots l$, are constants, and T is the time to complete the motion from the starting point $P_o$ to the terminal point $P_f$. Integrating the equation (9) with respect to time, and assuming that the starting and ending velocities are zero, the velocity along the path is obtained as $$\dot{s} = \frac{T}{\pi}\sum_{m=1}^{l}\frac{k_m}{m}\left[\sin\left(\frac{m\pi t}{T}\right)\right] \quad (10)$$

where $t=0$ at the starting point $P_o$. Substituting (10) in equation (7), the velocity vector $\Phi$ is obtained as $$\dot{\Phi} = d_{\Phi s}\frac{T}{\pi}\sum_{m=1}^{l}\frac{k_m}{m}\left[\sin\left(\frac{m\pi t}{T}\right)\right] \quad (11)$$

where the $n\times 1$ vector $d_{\Phi s} = [r_\Phi]^{-1}q_s$. From the equations (2) and (11) the following can be obtained $$[\dot{\Phi}\dot{\Phi}] = \quad (12)$$

$$\left(\frac{T}{\pi}\right)^2\left[\sum_{m=1}^{l}\frac{k_m}{m}\left(\sin\left(\frac{m\pi t}{T}\right)\right)\right]^2 [d_1 d_2 d_1 d_3 \ldots d_{n-1}d_n]^T$$

where $d_i, i=1,\ldots n$, is the ith element of the $n\times 1$ vector $d_{\Phi s}$. Similarly $$[\dot{\Phi}^2] = \left(\frac{T}{\pi}\right)^2\left[\sum_{m=1}^{l}\frac{k_m}{m}\left(\sin\left(\frac{m\pi t}{T}\right)\right)\right]^2 [d_1^2 d_2^2 \ldots d_n^2]^T \quad (13)$$

Substitute equations (9), (10), (12), and (13) in the equation (8) to obtain $$\dot{\Phi} = d_{\Phi s}\sum_{m=1}^{l} k_m\cos\left(\frac{m\pi t}{T}\right) + \quad (14)$$

$$\left(\frac{T}{\pi}\right)^2 D(\Phi,s)\left[\sum_{m=1}^{l}\frac{k_m}{m}\left(\sin\left(\frac{m\pi t}{T}\right)\right)\right]^2$$

where $$D(\Phi,s) = [r_\Phi]^{-1}(q_{ss} - [r_{\Phi\Phi}][d_1 d_2 \ldots d_{n-1}d_n]^T - [r_{\Phi 2}][d_1^2 \ldots d_n^2]^T)$$

Now substitute equation (12), (13), and (14) in the equation (1), to obtain the new equations of motion of the manipulator $$\Gamma = c_1(s)\sum_{m=1}^{l} k_m\cos\left(\frac{m\pi t}{T}\right) + \quad (15)$$

$$c_2(s)\left[\sum_{m=1}^{l}\frac{k_m}{m}\left(\sin\left(\frac{m\pi t}{T}\right)\right)\right]^2 + c_3(s)$$

where $c_1$ and $c_2$ are $n\times 1$ vectors, and are given as $$c_1(s) = M(\Phi)d_{\Phi s}$$

and $$c_2(s) = \left(\frac{T}{\pi}\right)^2 (B(\Phi)[d_1 d_2 \ldots d_{n-1}d_n]^T + C(\Phi)[d_1^2 \ldots d_n^2]^T + M(\Phi)D(\Phi,s))$$

The vectors $c_3(s)$ gives the gravity terms.
The vectors $c_1$, $c_2$, $c_3$ are written in terms of the variable s. However, it is always possible to find these vectors in terms of $\Phi$, as indicated by the relation (5). By integrating the equation (10), the variable s becomes $$s = \left(\frac{T}{\pi}\right)^2\sum_{m=1}^{l}\frac{k_m}{m^2}\left[1 - \cos\left(\frac{m\pi t}{T}\right)\right] \quad (16)$$

Similarly, the variables $\Phi$ can be found in terms of time t by using the equations (16) and (5).

Using the equation (16), the vectors $c_1$, $c_2$, $c_3$ can be written in terms of the sinusoidal time function of the basis trajectory. The vectors are then substituted into the equations of motion (15). It is then possible to show that by manipulating the resulting equations of motion, the equations may be formulated as the summation of the sinusoidal time function of the basis trajectory and its harmonics. The ease with which the formulation can be carried out is dependent on the complexity of the kinematic structure of the manipulator and the choice of the coordinate space within which the trajectories are defined. It is clear that the task is more involved when the trajectories are described in the task coordinate space. The coefficients $k_m$ are found in such a manner that the actuator force (torque) limits, equation (4), are maintained within their prescribed ranges.

In the following example of an application of the method of the present invention, the inverse dynamics equations of plane RP manipulators are derived for point to point motions along straight line paths in the joint coordinate space with trajectories belonging to two different patterns. In another example, classes of inverse dynamics models are derived for plane 2R manipulators.

Plane RP Manipulators

Figure 3:
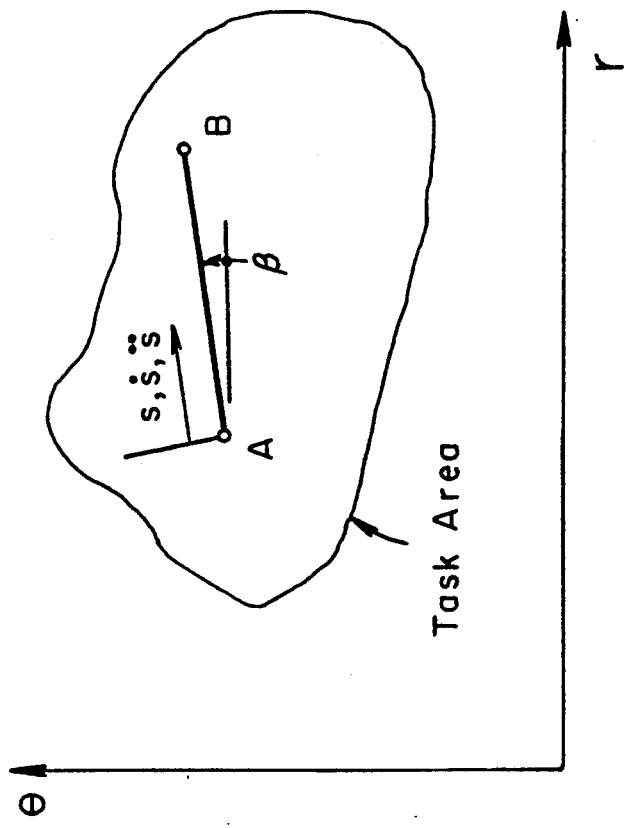
FIG. 3 is a two-dimensional graph showing the point to point motions of the robot manipulator along straight line paths defined in the joint coordinates of the manipulator.

To illustrate an application of the method of the present invention, a plane RP manipulator, as shown in FIG. 2, operating in the horizontal plane is first considered. The link 1 has a moment of inertia $I_1$ about its center of gravity $0_1$. The link 2 has a mass $m_2$ and moment of inertia $I_2$ about its center of gravity $0_2$, and l is the distance from the end-effector, E, to $0_2$. The actuators produce the torque $\tau$ and force f at the joints R and P, respectively. The manipulator is to make point to point motions along straight line paths defined in the joint coordinates of the manipulator. A typical path in the joint coordinate space is shown in FIG. 3. The end-effector starts from rest from the point A, moves along the straight line AB, and comes to rest at the point B. The coordinate s describes the distance traveled along the line AB, from the point A. In the next two examples, the inverse dynamics models of the method of the present invention are derived using trajectories belonging to two different patterns.

EXAMPLE 1

Inverse Dynamics Model for a First Pattern (Pattern I)

Now consider trajectories for which the acceleration of the end-effector along the path of motion is described by $$\ddot{s} = k\cos\left(\frac{\pi t}{T}\right) \quad (17)$$

where k is a constant, and T is the time taken to complete the motion. The cosine time function, $\cos(\pi t/T)$ describes the sinusoidal time function of the basis trajectory. The trajectories are seen to be described in terms of the sinusoidal time function of the basis trajectory alone. For each motion, the constant k is selected in such a way that the following constant actuator torque and force limits are maintained.

$$\tau_{mm} \leq \tau \leq \tau_{max} \text{ and } f_{min} \leq f \leq f_{max}$$

The equations of motion of the RP manipulator in the joint coordinate space can be shown to be $$[I_1 + \Gamma_2 + m_2(r-l)^2]\ddot{\theta} + 2m_2(r-l)\dot{r}\dot{\theta} = \tau \quad (18a)$$

$$m_2\ddot{r} - m_2(r-l)\dot{\theta}^2 = f \quad (18b)$$

Using the equation (17), the joint accelerations become $$\ddot{r} = kC\beta\cos\left(\frac{\pi t}{T}\right) \quad (19a)$$

$$\ddot{\theta} = kS\beta\cos\left(\frac{\pi t}{T}\right) \quad (19b)$$

where $\beta$ is the angle between the path of motion and the r axis, FIG. 3, and $S\beta = \sin\beta$, and $C\beta = \cos\beta$. By integrating equations (19), the joint velocities and positions are found as $$\dot{r} = D_1 C\beta \sin\left(\frac{\pi t}{T}\right) \quad (20a)$$

$$\dot{\theta} = D_1 S\beta \sin\left(\frac{\pi t}{T}\right) \quad (20b)$$

$$r = r_A - k\left(\frac{T}{\pi}\right)^2 C\beta\left[\cos\left(\frac{\pi t}{T}\right) - 1\right] \quad (21a)$$

$$\theta = \theta_A - k\left(\frac{T}{\pi}\right)^2 S\beta\left[\cos\left(\frac{\pi t}{T}\right) - 1\right] \quad (21b)$$

where $(r_A, \Theta_A)$ is the joint coordinates of the starting point, and $D_1 = kT/\pi$. Substituting (19), (20), and (21) into (18), the inverse dynamics equations become $$\begin{bmatrix} \tau \\ f \end{bmatrix} = \begin{bmatrix} A_{11} & A_{12} & A_{13} & A_{14} \\ A_{21} & A_{22} & A_{23} & A_{24} \end{bmatrix} \begin{bmatrix} 1 \\ \cos(\pi t/T) \\ \cos(2\pi t/T) \\ \cos(3\pi t/T) \end{bmatrix} \quad (22)$$

where $$A_{11} = 0 \qquad A_{21} = -m_2 \frac{D_1^2}{2} S^2\beta D_3$$

$$A_{12} = kS\beta[I_1 + I_2 + m_2 D_2] \qquad A_{22} = m_2 kC\beta\left[1 + \frac{D_1^4}{4k^2} S^2\beta\right]$$

$$A_{13} = -2m_2 D_1^2 S\beta C\beta D_3 \qquad A_{23} = m_2 \frac{D_1^2}{2} S^2\beta D_3$$

$$A_{14} = \frac{3m_2 D_1^4}{4k} S\beta C^2\beta \qquad A_{24} = -m_2 \frac{D_1^4}{4k} S^2\beta C\beta$$

In which $$D_1 = \frac{kT}{\pi}$$

$$D_2 = \left[(r_A - l)^2 + 2(r_A - l)\frac{D_1^2}{k}C\beta + \frac{5D_1^4}{4k^2}C^2\beta\right]$$

$$D_3 = (r_A - l) + \frac{D_1^2}{k}C\beta$$

The equations (22) are in terms of the sinusoidal time function of the basis trajectory and its second and third harmonics. The coefficients $A_{ij}$ (i=1,2; j=1,2,3,4) are in terms of the kinematic and inertia parameters, selected path (through the angle $\beta$), the starting point $r_A$, and the actuator torque and force limits (through k and T). During each motion, the coefficients $A_{ij}$ stay constant.

The inverse dynamics model (i.e., equations (22)) represents a class of inverse dynamic models. All trajectories yielding an inverse dynamics model containing the sinusoidal function of the basis trajectory and its second and third harmonics (i.e., inverse dynamics models in the form of equations (22)), belong to the trajectory pattern corresponding to this case of models. The trajectories described in this section by equation (17) identify one of the sets of possible trajectories that belong to this trajectory pattern.

EXAMPLE 2

Inverse Dynamics Model for a Second Pattern (Pattern II)

The second set of trajectories is defined by the acceleration $$\ddot{s} = k_0 \cos\left(\frac{\pi t}{T}\right) + k_1 \cos\left(\frac{3\pi t}{T}\right) \quad (23)$$

where $k_o$ and $k_1$ are constants, and T is the time taken to complete the motion. By selecting appropriate relative values for the constants $k_o$ and $k_1$, the above trajectory will approximate a trapezoidal velocity profile for joint motions. The constants are selected in such a way that the manipulator actuator limits are not exceeded. Following the procedure described in the above derivations, the resulting inverse dynamics equations can be shown to become $$\begin{bmatrix} \tau \\ f \end{bmatrix} = \begin{bmatrix} B_{11} & B_{12} & B_{13} & B_{14} & B_{15} & B_{16} & B_{17} & B_{18} & B_{19} \\ B_{21} & B_{22} & B_{23} & B_{24} & B_{25} & B_{26} & B_{27} & B_{28} & B_{29} \end{bmatrix} \begin{bmatrix} 1 \\ \cos(\pi t/T) \\ \cos(2\pi t/T) \\ \cos(3\pi t/T) \\ \cos(4\pi t/T) \\ \cos(5\pi t/T) \\ \cos(6\pi t/T) \\ \cos(7\pi t/T) \\ \cos(9\pi t/T) \end{bmatrix} \quad (24)$$

where the expressions for the coefficients $B_{ij}$ are as given below. It should be noted that the equations do not contain the eighth harmonic.

$B_{11} = \frac{1}{2}S\beta(a_1k_0 + a_3k_1) + b_1b_2$ $B_{12} = a_0k_0S\beta + \frac{1}{2}a_2k_0S\beta + \frac{1}{2}a_0k_1S\beta + \frac{1}{4}a_4k_1S\beta - 2m_2k_0\left(\frac{T}{\pi}\right)^2 S\beta b_2 - m_2k_0\left(\frac{T}{\pi}\right)^2 S\beta b_3 - m_2k_1\left(\frac{T}{3\pi}\right)^2 S\beta b_3 + m_2k_1^2k_0\left(\frac{T}{3\pi}\right)^3\left(\frac{T}{\pi}\right)S^2\beta C\beta$ $B_{13} = \frac{1}{2}a_1k_0S\beta + \frac{1}{2}a_1k_1S\beta + \frac{1}{2}a_3k_0S\beta + b_1b_3$ $B_{14} = (a_0k_1 + \frac{1}{2}a_0k_0 + \frac{1}{2}a_4k_0 + \frac{1}{2}a_0k_1)S\beta - 2m_2k_1\left(\frac{T}{3\pi}\right)^2 S\beta b_2 - m_2k_0\left(\frac{T}{\pi}\right)^2 S\beta b_3 + m_2k_0^2k_1\left(\frac{T}{\pi}\right)^3\left(\frac{T}{3\pi}\right)S^2\beta C\beta + \frac{1}{2}m_2k_1^3\left(\frac{T}{3\pi}\right)^4 S^2\beta C\beta$ $B_{15} = \frac{1}{2}a_1k_1S\beta + \frac{1}{2}a_3k_0S\beta + b_1k_1k_0\left(\frac{T}{3\pi}\right)\left(\frac{T}{\pi}\right)S\beta C\beta$ $B_{16} = (\frac{1}{2}a_0k_1 + \frac{1}{2}a_4k_0 + \frac{1}{2}a_0k_0)S\beta - m_2k_1\left(\frac{T}{3\pi}\right)^2 S\beta b_3 + m_2k_0^2k_1\left(\frac{T}{\pi}\right)^3\left(\frac{T}{3\pi}\right)S^2\beta C\beta + \frac{1}{2}m_2k_0k_1^2\left(\frac{T}{\pi}\right)^2\left(\frac{T}{3\pi}\right)^2 S^2\beta C\beta$ $B_{17} = \frac{1}{2}a_3k_1S\beta - \frac{1}{2}b_1k_1^2\left(\frac{T}{3\pi}\right)^2 S\beta C\beta$ $B_{18} = \frac{1}{2}a_4k_1S\beta + \frac{1}{2}a_0k_0S\beta + m_2k_1^2k_0\left(\frac{T}{3\pi}\right)^3\left(\frac{T}{\pi}\right)S^2\beta C\beta + \frac{1}{2}m_2k_1^2k_0\left(\frac{T}{3\pi}\right)^2\left(\frac{T}{\pi}\right)^2 S^2\beta C\beta$ $B_{19} = \frac{1}{2}a_0k_1S\beta + \frac{1}{2}m_2k_1^3\left(\frac{T}{3\pi}\right)^4 S^2\beta C\beta$ $B_{21} = -\frac{1}{2}b_1c_1$ $B_{22} = 2m_2k_0C\beta + m_2k_0\left(\frac{T}{\pi}\right)^2 S\beta c_1 + \frac{1}{2}m_2k_0\left(\frac{T}{\pi}\right)^2 S\beta c_2 + \frac{1}{2}m_2k_1\left(\frac{T}{3\pi}\right)^2 S\beta c_2 + \frac{1}{2}m_2k_1\left(\frac{T}{3\pi}\right)^2 S\beta c_3$ $B_{23} = -\frac{1}{2}b_1c_2$ $B_{24} = 2m_2k_1C\beta + \frac{1}{2}m_2k_0\left(\frac{T}{\pi}\right)^2 S\beta c_2 + \frac{1}{2}m_2k_0\left(\frac{T}{\pi}\right)^2 S\beta c_3 + m_2k_1\left(\frac{T}{3\pi}\right)^2 S\beta c_1 + \frac{1}{2}m_2k_1\left(\frac{T}{3\pi}\right)^2 S\beta c_4$ $B_{25} = -\frac{1}{2}b_1c_3$ $B_{26} = \frac{1}{2}m_2k_0\left(\frac{T}{\pi}\right)^2 S\beta c_3 + \frac{1}{2}m_2k_0\left(\frac{T}{\pi}\right)^2 S\beta c_4 + \frac{1}{2}m_2k_1\left(\frac{T}{3\pi}\right)^2 S\beta c_2$ $B_{27} = -\frac{1}{2}b_1c_4$ $B_{28} = \frac{1}{2}m_2k_0\left(\frac{T}{\pi}\right)^2 S\beta c_4 + \frac{1}{2}m_2k_1\left(\frac{T}{3\pi}\right)^2 S\beta c_3$ $B_{29} = \frac{1}{2}m_2k_1\left(\frac{T}{3\pi}\right)^2 S\beta c_4$ where $a_0 = I_1 + I_2 + \left[m_2r_A - m_2l + k_0\left(\frac{T}{\pi}\right)^2 S\beta + k_1\left(\frac{T}{3\pi}\right)^2 S\beta\right]^2 + \frac{1}{2}S^2\beta\left[k_0^2\left(\frac{T}{\pi}\right)^4 + k_1^2\left(\frac{T}{3\pi}\right)^4\right]$ $a_1 = 2\left[m_2r_A - m_2l + k_0\left(\frac{T}{\pi}\right)^2 S\beta + \right.$ -continued $$a_2 = \tfrac{1}{2}S^2\beta k_0^2\left(\frac{T}{\pi}\right)^4 - \left(\frac{T}{\pi}\right)^2\left(\frac{T}{3\pi}\right)^2 S^2\beta k_0 k_1$$

$$\left. k_1\left(\frac{T}{3\pi}\right)^2 S\beta \right] k_0\left(\frac{T}{\pi}\right)^2 S\beta$$

$$a_3 = 2\left[ m_2 r_A - m_2 l + k_0\left(\frac{T}{\pi}\right)^2 S\beta + k_1\left(\frac{T}{3\pi}\right)^2 S\beta \right] k_1\left(\frac{T}{3\pi}\right)^2 S\beta$$

$$a_4 = -\left(\frac{T}{\pi}\right)^2\left(\frac{T}{3\pi}\right)^2 S^2\beta k_0 k_1$$

$$a_5 = \tfrac{1}{2}k_1^2\left(\frac{T}{3\pi}\right)^4 S^2\beta$$

$$b_1 = 2m_2\left[ r_A - l + k_0\left(\frac{T}{\pi}\right)^2 S\beta + k_1\left(\frac{T}{3\pi}\right)^2 S\beta \right]$$

$$b_2 = \tfrac{1}{2}k_0\left(\frac{T}{\pi}\right)^2 S\beta C\beta + \tfrac{1}{2}k_1\left(\frac{T}{3\pi}\right)^2 S\beta C\beta$$

$$b_3 = -\tfrac{1}{2}k_0^2\left(\frac{T}{\pi}\right)^2 S\beta C\beta + k_1 k_0\left(\frac{T}{\pi}\right)\left(\frac{T}{3\pi}\right) S\beta C\beta$$

$$c_1 = \tfrac{1}{2}k_0^2\left(\frac{T}{\pi}\right)^2 S^2\beta + \tfrac{1}{2}k_1^2\left(\frac{T}{3\pi}\right)^2 S^2\beta$$

$$c_2 = -\tfrac{1}{2}k_0^2\left(\frac{T}{\pi}\right)^2 S^2\beta + k_0 k_1\left(\frac{T}{\pi}\right)\left(\frac{T}{3\pi}\right) S^2\beta$$

$$c_3 = -k_0 k_1\left(\frac{T}{\pi}\right)\left(\frac{T}{3\pi}\right) S^2\beta$$

$$c_4 = -\tfrac{1}{2}k_1^2\left(\frac{T}{3\pi}\right)^2 S^2\beta$$

Figure 4:
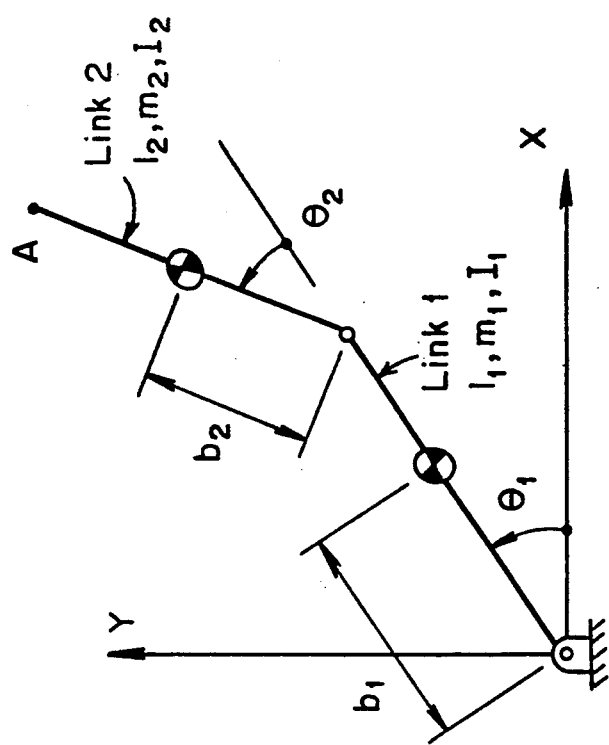
FIG. 4 is a two-dimensional diagram of a plane 2R manipulator operating in the vertical plane.

Inverse Dynamics Model and the Inherent Characteristics of Plane 2R Manipulators Next consider a plane 2R manipulator, as shown in FIG. 4, operating in the vertical plane. The links 1 and 2 have lengths $l_1$ and $l_2$, masses $m_1$ and $m_2$, moments of inertia $I_1$ and $I_2$ about the mass centers, and $b_1$ and $b_2$ are distances to the mass centers, as shown in FIG. 4. The equations of motion of such a manipulator can be shown to be $$\tau_1 = (I_1 + I_2 + m_1 b_1^2 + m_2 l_1^2 + m_2 b_2^2 + \qquad (25a)$$
$$2m_2 l_1 b_2 \cos\theta_2)\ddot\theta_1 + (I_2 + m_2 b_2^2 + m_2 l_1 b_2 \cos\theta_2)\ddot\theta_2 -$$
$$m_2 l_1 b_2 (2\dot\theta_1 \dot\theta_2 + \dot\theta_2^2)\sin\theta_2 + (m_1 b_1 + m_2 l_1)g\cos\theta_1 +$$
$$m_2 g b_2 \cos(\theta_1 + \theta_2)$$

$$\tau_2 = (I_2 + m_2 b_2^2)(\ddot\theta_2) + (I_2 + m_2 b_2^2 + m_2 l_1 b_2 \cos\theta_2)\ddot\theta_1 + \qquad (25b)$$
$$m_2 l_1 b_2 \dot\theta_1^2 \sin\theta_2 + m_2 g b_2 \cos(\theta_1 + \theta_2)$$

Now consider trajectories defined by equation (17) along straight line paths in the joint coordinate space. The joint accelerations, velocities, and positions can then be shown to be $$\ddot\theta_1 = k_1 \cos(\omega t) \text{ and } \ddot\theta_2 = k_2 \cos(\omega t)$$

$$\dot\theta_1 = \frac{k_1}{\omega}\sin(\omega t) \text{ and } \dot\theta_2 = \frac{k_2}{\omega}\sin(\omega t)$$

$$\theta_1 = \theta_{1m} + a_1 \cos(\omega t) \text{ and } \theta_2 = \theta_{2m} + a_2 \cos(\omega t)$$

where $\omega = \pi/T$, $\beta$ is the angle between the path of motion and $\theta_1$, $k_1 = k\cos\beta$, $k_2 = k\sin\beta$, $a_1 = -k_1/\omega^2$, $a_2 = -k_2/\omega^2$, $\theta_{1m} = \theta_{10} + k_1/\omega^2$, and $\theta_{2m} = \theta_{20} + k_2/\omega^2 \cdot \theta_{10}$ and $\theta_{20}$ indicate the position of the joint variables $\Theta_1$ and $\Theta_2$ at the start of motion. The functions $\cos\theta_2$, $\sin\theta_2$, and $\cos(\theta_1+\theta_2)$ are then expanded about $\theta_2=\theta_{2m}$, and $(\theta_{1m}+\theta_{2m})$ in Taylor series up to the required number of terms. Substituting the Taylor series expansions and the above expressions for the joint variable positions, velocities, and accelerations into the equations of motion (25), the inverse dynamics models is obtained as $$\tau_1 = s_{10} + s_{11}\cos(wt) + s_{12}\cos(2wt) + \ldots \qquad (26a)$$
$$+ s_{1,2i}\cos(2iwt) + s_{1,2i+1}\cos((2i+1)wt)$$

$$\tau_2 = s_{20} + s_{21}\cos(wt) + s_{22}\cos(2wt) + \ldots \qquad (26b)$$
$$+ s_{2,2i}\cos(2iwt) + s_{2,2i+l}\cos((2i+1)wt)$$

where i defines the number of harmonics appearing in the inverse dynamics model, and $$s_{10} = t_{10} + \sum_{j=1}^{i}\left[\frac{1}{2^{2j}} t_{1,2j} C_{2j}^{j}\right]$$

$$s_{20} = t_{20} + \sum_{j=1}^{i}\left[\frac{1}{2^{2j}} t_{2,2j} C_{2j}^{j}\right]$$

$$s_{11} = t_{11} + \sum_{j=1}^{i}\left[\frac{1}{2^{2j}} t_{1,2j+1} C_{2j+1}^{j}\right]$$

$$s_{21} = t_{21} + \sum_{j=1}^{i}\left[\frac{1}{2^{2j}} t_{2,2j+1} C_{2j+1}^{j}\right]$$

$$s_{1,2k} = \sum_{j=k}^{i}\left[\frac{1}{2^{2j-1}} t_{1,2j} C_{2j}^{j-k}\right]$$

$$s_{2,2k} = \sum_{j=k}^{i}\left[\frac{1}{2^{2j-1}} t_{2,2j} C_{2j}^{j-k}\right]$$

$$s_{1,2k+1} = \sum_{j=k}^{i}\left[\frac{1}{2^{2j}} t_{1,2j+1} C_{2j+1}^{j-k}\right]$$

$$s_{2,2k+1} = \sum_{j=k}^{i}\left[\frac{1}{2^{2j}} t_{2,2j+1} C_{2j+1}^{j-k}\right]$$

where $C_n^m = \dfrac{n!}{m!(n-m)!}$, and $(1 \leq k \leq i)$, and

-continued $$t_{10} = -\frac{m_2 l_1 b_2}{\omega^2}(2k_1 k_2 + k_2^2)\sin\theta_{2m} + (m_1 b_1 + m_2 l_1)g\cos\theta_{1m} +$$

$$m_2 g b_2 \cos(\theta_{1m} + \theta_{2m})$$

$$t_{11} = (I_1 + m_1 b_1^2 + m_2 l_1^2)k_1 + (I_2 + m_2 b_2^2)(k_1 + k_2) +$$

$$m_2 l_1 b_2(2k_1 + k_2)\cos\theta_{2m} - \frac{m_2 l_1 b_2 a_2}{\omega^2}(2k_1 k_2 + k_2^2)\cos\theta_{2m} -$$

$$(m_1 b_1 + m_2 l_1)g a_1 \sin\theta_{1m} - m_2 g b_2(a_1 + a_2)\sin(\theta_{1m} + \theta_{2m})$$

$$t_{1n} = m_2 l_1 b_2(2k_1 + k_2)\frac{\cos(\beta_{2m} + (n-1)\pi/2)}{(n-1)!} a_2^{n-1} -$$

$$\frac{m_2 l_1 b_2}{\omega^2}(2k_1 k_2 + k_2^2)\left[\frac{\sin(\theta_{2m} + n\pi/2)}{n!} a_2^n - \frac{\sin(\theta_{2m} + (n-2)\pi/2)}{(n-2)!} a_2^{n-2}\right] + (m_1 b_1 +$$

$$m_2 l_1)g \frac{\cos(\theta_{1m} + n\pi/2)}{n!} a_1^n +$$

$$m_2 g b_2 \left[\frac{\cos(\theta_{1m} + \theta_{2m} + n\pi/2)}{n!}(a_1 + a_2)^n\right](n \geq 2)$$

$$t_{20} = m_2 l_1 b_2 \frac{k_1^2}{\omega^2}\sin\theta_{2m} + m_2 g b_2 \cos(\theta_{1m} + \theta_{2m})$$

$$t_{21} = (I_2 + m_2 b_2^2)(k_1 + k_2) + m_2 l_1 b_2 k_1 \cos\theta_{2m} +$$

$$m_2 l_1 b_2 \frac{k_1^2}{\omega^2} a_2 \cos\theta_{2m} - m_2 g b_2(a_1 + a_2)\sin(\theta_{1m} + \theta_{2m})$$

$$t_{2n} = m_2 l_1 b_2 k_1 \frac{\cos(\theta_{2m} + (n-1)\pi/2)}{(n-1)!} a_2^{n-1} +$$

$$m_2 l_1 b_2 \frac{k_1^2}{\omega^2}\left[\frac{\sin(\theta_{2m} + n\pi/2)}{n!} a_2^n - \frac{\sin(\theta_{2m} + (n-2)\pi/2)}{(n-2)!} a_2^{n-2}\right] +$$

$$m_2 g b_2 \frac{\cos(\theta_{1m} + \theta_{2m} + n\pi/2)}{n!}(a_1 + a_2)^n (n \geq 2)$$

As can be seen from the equations describing $s_{1i}$ and $s_{2i}$, the magnitudes of the coefficients tend to decrease as the harmonic number increases. Thus, the contribution of the higher harmonic terms becomes increasingly insignificant. The relative magnitudes of the coefficients are dependent on the positions of the starting and ending points of the path. By neglecting the harmonics with negligible coefficient values, and the harmonics to which the system does not show an appreciable response, a most realistic dynamic model of the robot manipulator is obtained.

Figure 5:
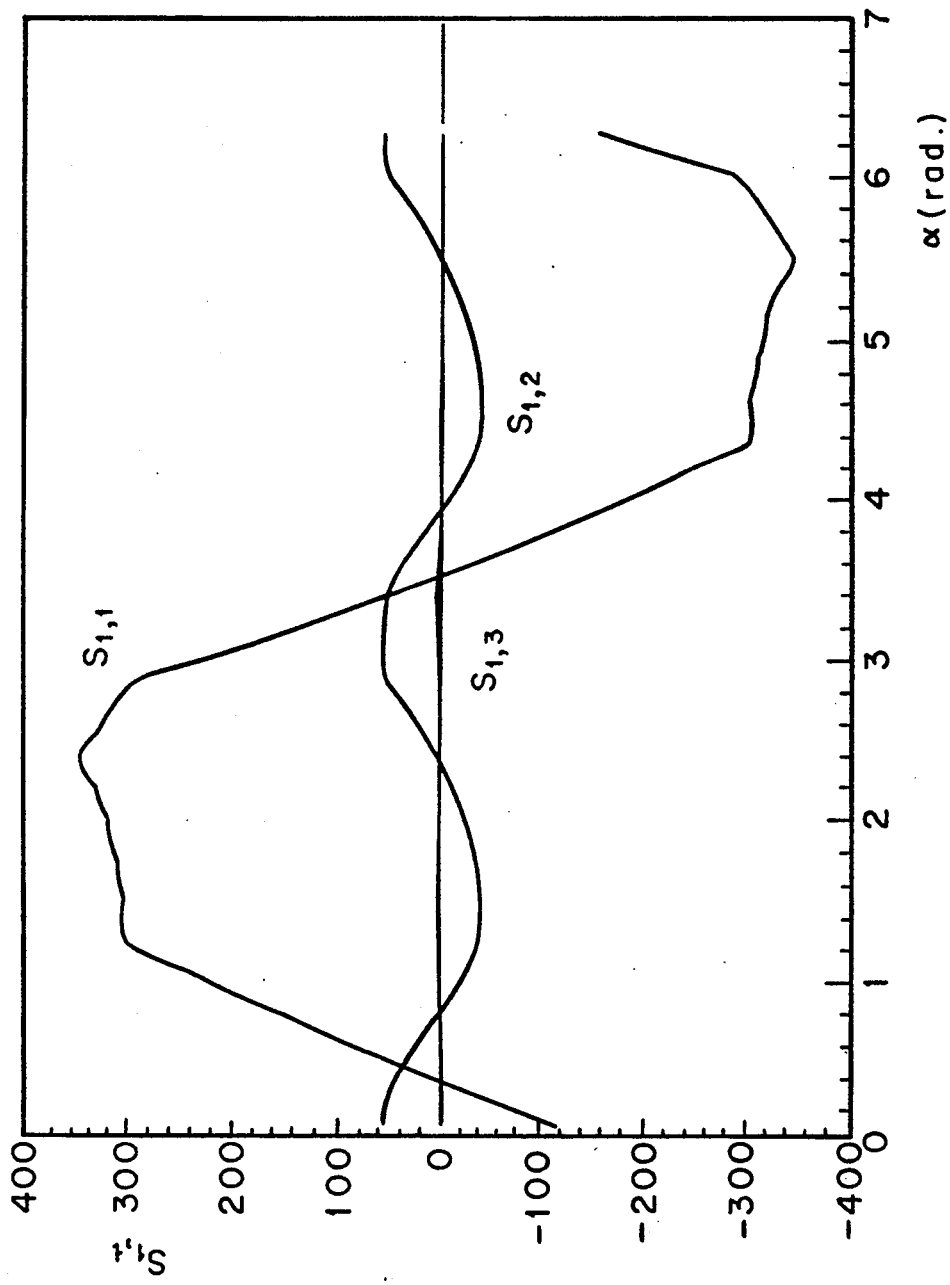
FIG. 5 is a graph illustrating the magnitudes of trajectory coefficients $S_{1i}$ for a 2R manipulator.
Figure 6:
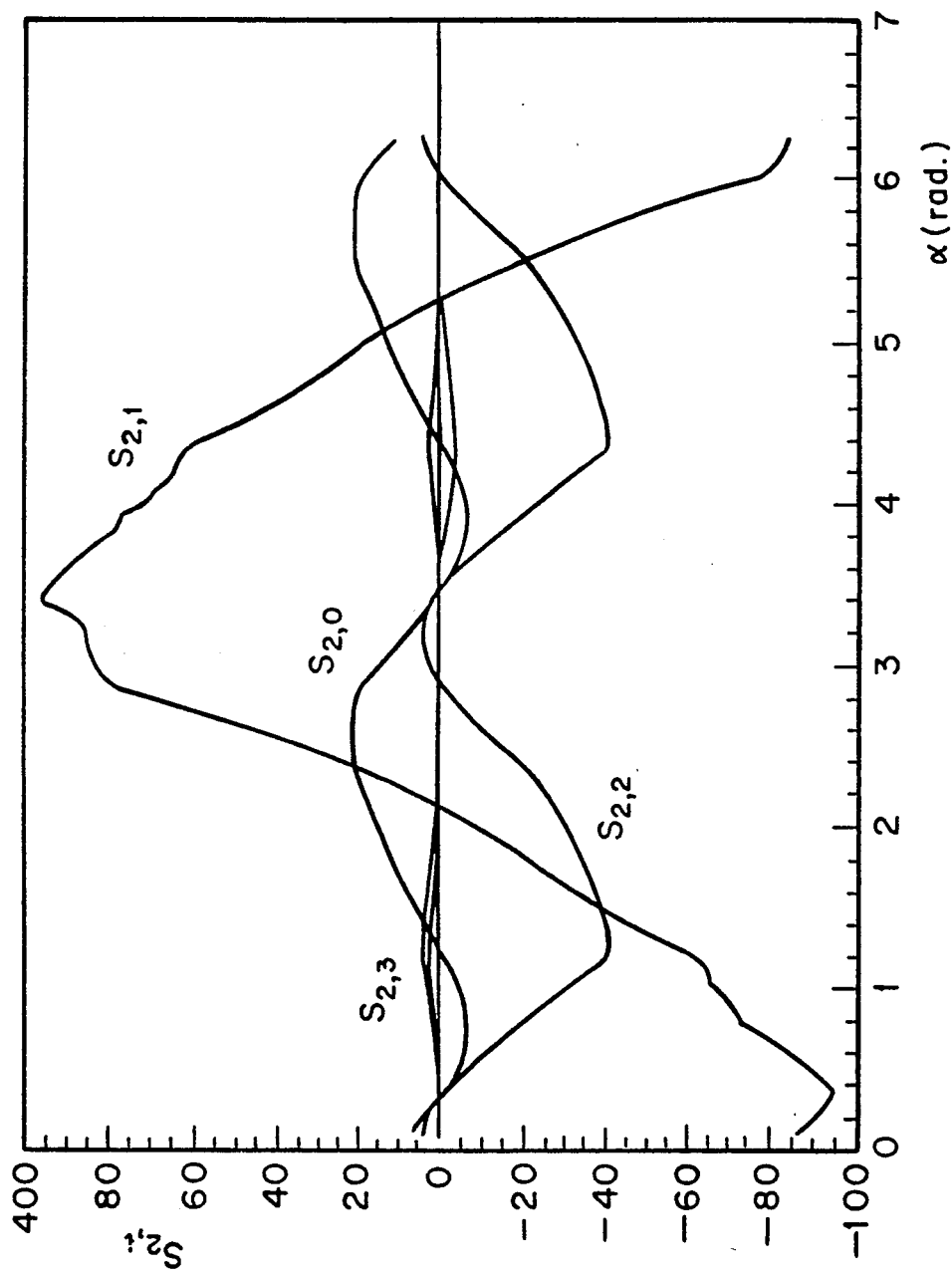
FIG. 6 is a graph illustrating the magnitudes of the trajectory coefficient $S_{2i}$ for a 2R manipulator.

As an example, consider a 2R manipulator with $l_1 = l_2 = 0.5$ m, $m_1 = 50$ kg, $m_2 = 30$ kg, and $g = 9.8$ m/s$^2$. The mass of each link is assumed to be distributed uniformly along its length. Consider motions starting from the point (x=0.35, y=0.35), and ending at points on a circle with a radius of 0.2 m (centered at the above starting point). Motions are along straight line paths in the joint coordinate space. FIGS. 5 and 6 are the plots of the coefficients $s_{1i}$ and $s_{2i}$ for different points on the above circle (identified by the angle $\alpha$ between the positive X axis and the radius indicating the position of the ending point on the circle). As can be seen, for both equations of motion, (26a) and (26b), only components up to the second harmonic have significant magnitudes for the entire range of $\alpha$, and that in general, the fundamental frequency constitutes the dominant components of the actuating torques.

A Rigid-Link Plane RP Manipulator with a Flexible Joint

As another example of the invention, consider a rigid-link plane RP manipulator with a flexible revolute joint, as shown in FIG. 2, with the indicated geometrical and inertial parameters. The joint flexibility is modeled as a spring with stiffness $k_m$ connecting the link to the actuator motor shaft. The motor moment of inertia is $I_m$. The actuators produce torque $\tau$ and force f at the joints R and P, respectively. It is assumed that the end-effector of the manipulator is to track straight line paths in the joint coordinate space. A typical path of motion is shown in FIG. 3. The angles $\Theta_1$ and $\Theta_m$ (measured from the positive X axis, as shown in FIG. 2), are the link and motor joint angles, respectively.

For this manipulator, the equations of motion can be shown to be $$[I_1 + I_2 + m_2(r-l)^2]\ddot{\theta}_l + 2m_2(r-l)\dot{r}\dot{\theta}_l + k_m(\theta_l - \theta_m) = 0 \quad (27a)$$

$$I_m \ddot{\theta}_m - k_m(\theta_l - \theta_m) = \tau \quad (27b)$$

$$m_2 \ddot{r} - m_2(r-l)\dot{\theta}_l^2 = f \quad (27c)$$

In this example, the motion will be completed in two stages. In the first stage of the motion, $\Theta_m$ is described by a sinusoidal time function. In the second stage, the motion is described through the motion of the end-effector along the path of motion, using a second sinusoidal time function. The objective is to track the straight line path without oscillations.

The time taken to complete the first stage of motion is considered to be relatively short. Changes in the manipulator's position and velocity is therefore limited. This means that in equation (27a), the velocity product term can be neglected, and the squared position term can be considered to stay constant. With these assumptions, the equation (27a) can be written as $$\ddot{\theta}_l + \omega_n^2 \theta_l = \omega_n^2 \theta_m \quad (28)$$

where $$\omega_n^2 = \frac{k_m}{I_1 + I_2 + m_2 l_1^2},$$

and $l_1 = r - l$. In the first stage, motion will be described through the following acceleration of the motor $$\ddot{\theta}_m = k_1 \cos\omega_1 t \quad (29)$$

where $k_1$ is a constant, and $\omega_1$ the frequency of the sinusoidal time function. At the start of motion, all the velocities are equal to zero and $\Theta_1 = \Theta_m$. By integrating equation (29), $\dot{\Theta}_m$ and $\Theta_m$ are found as $$\theta_m = \frac{k_1}{\omega_1} \sin\omega_1 t \tag{30a}$$

$$\theta_m = -\frac{k_1}{\omega_1^2} \cos\omega_1 t + \frac{k_1}{\omega_1^2} + \theta_{1,0} \tag{30b}$$

where $\Theta_{1,o}$ is the initial position of $\Theta_m$ (and $\Theta_l$). Substituting equation (30b) into (28), and applying the appropriate initial conditions, $\Theta_1$ and $\dot{\Theta}_1$ are found as $$\theta_1 = -\frac{k_1}{\omega_1^2 - \omega_n^2} \cos\omega_n t + \tag{31}$$

$$\frac{k_1}{\omega_1^2} \frac{\omega_n^2}{\omega_1^2 - \omega_n^2} \cos\omega_1 t + \frac{k_1}{\omega_1^2}$$

$$\dot{\theta}_1 = \frac{k_1\omega_1}{\omega_1^2 - \omega_n^2} \sin\omega_n t - \frac{k_1}{\omega_1} \frac{\omega_n^2}{\omega_1^2 - \omega_n^2} \sin\omega_1 t \tag{32}$$

Since the motion is along a straight line path, FIG. 3, r and $\dot{r}$ can be found from equations (31) and (32) as $$r = r_0 + \cot g\beta(\theta_l - \theta_{l,0}) \tag{33a}$$

$$\dot{r} = \cot g\beta\,\dot{\theta}_l \tag{33b}$$

where $r_o$ is the initial position of the joint variable r. Now let the time taken to complete the first stage of motion be indicated by $t_1$. Then the positions and velocities at the completion of the first stage of motion are obtained by substituting $t_1$ for t in equations (30)–(33).

For this stage of motion, the inverse dynamics equations are obtained by substituting (29), (30b), (31), (32), (33a), and the time derivative of (33b) into equations (27b) and (27c). The resulting equations of motion will obviously be in terms of the sinusoidal time function with frequency $\omega_1$, and its harmonics.

Now let the second stage of the motion be described by the following acceleration of the end-effector along the path of motion, as shown in FIG. 3:

$$\ddot{s} = k_2 \cos(\omega_2 t + \delta_1) + k_3 \cos(2\omega_2 t + \delta_2) \tag{34}$$

It should be noted that for this phase of the motion, for simplicity, the starting time is taken to be at $t=0$ (rather than $t=t_1$). The choice of $2\omega_2$ for the second term is arbitrary, but will simplify the algebraic manipulations. The acceleration (equation 34) can be used to find the acceleration r and $\Theta_1$. After integrating the resulting accelerations, the joint positions and velocities become $$\dot{\theta}_1 = \frac{k_2}{\omega_2} \sin\beta \sin(\omega_2 t + \delta_1) + \frac{k_3}{2\omega_2} \sin\beta \sin(2\omega_2 t + \delta_2) + \dot{\theta}_{l,t1} \tag{35a}$$

$$\theta_1 = -\frac{k_2}{\omega_2^2} \sin\beta \cos(\omega_2 t + \delta_1) - \tag{35b}$$

$$\frac{k_3}{4\omega_2^2} \sin\beta \cos(2\omega_2 t + \delta_2) + \theta_{l,t1}$$

$$\dot{r} = \frac{k_2}{\omega_2} \cos\beta \sin(\omega_2 t + \delta_1) + \frac{k_3}{2\omega_2} \cos\beta \sin(2\omega_2 t + \delta_2) + \dot{r}_{t1} \tag{35c}$$

$$r = -\frac{k_2}{\omega_2^2} \cos\beta \cos(\omega_2 t + \delta_1) - \frac{k_3}{4\omega_2^2} \cos\beta \cos(2\omega_2 t + \delta_2) + r_{t1} \tag{35d}$$

where $\dot{\theta}_{l,t1}$, $\theta_{l,t1}$, $\dot{r}_{t1}$, and $r_{t1}$ are the corresponding values at the start of the second stage of motion (i.e., at the end of the first stage of motion). By substituting equations (35) into equation (27a), $\Theta_m$ is found as $$\theta_m = C_0 + C_1\cos(\omega_2 t + \delta_1) + C_2\cos(\omega_2 t + \delta_2 - \delta_1) + \tag{36}$$

$$C_3\cos(2\omega_2 t + \delta_2) + C_4\cos(2\omega_2 t + 2\delta_1) +$$

$$C_5\cos(3\omega_2 t + \delta_1 + \delta_2) + C_6\cos(3\omega_2 t - \delta_1 + 2\delta_2) +$$

$$C_7\cos(3\omega_2 t + 3\delta_1) + C_8\cos(4\omega_2 t + 2\delta_2) +$$

$$C_9\cos(4\omega_2 t + 2\delta_1 + \delta_2) + C_{10}\cos(5\omega_2 t + 2\delta_2 + \delta_1) +$$

$$C_{11}\cos(6\omega_2 t + 3\delta_2)$$

where $c_i$, $i = 1, 2, \ldots, 11$ are as given below.

$$c_0 = \frac{m_2\sin\beta}{2k_m} \left[ b_1k_2 + b_3k_3 + \cos(\delta_2 - 2\delta_1) \times \right.$$

$$\left. \left[ (b_2k_2 + b_4k_3) - \frac{5k_2^2k_3}{4\omega_2^4}\cos^2\beta \right] \right] +$$

$$(r_0 - l)\frac{\sin\beta\cos\beta}{2\omega_2^2}\left[ k_2^2 + \frac{k_3^2}{4} \right] + \theta_0$$

$$c_1 = \frac{I_1 + I_2 + m_2b_0}{k_m} k_2\sin\beta + \frac{m_2\sin\beta}{2k_m}[b_4k_2 + b_2k_3 + b_5k_3] -$$

$$\frac{m_2k_2\sin\beta\cos^2\beta}{2k_m\omega_2^4}\left( k_2^2 + \frac{k_3^2}{2} \right) - \frac{k_2}{\omega_2^2}\sin\beta$$

$$c_2 = \frac{m_2\sin\beta}{2k_m}(b_3k_2 + b_1k_3) + (r_0 - l)\frac{k_2k_3}{2\omega_2^2}\sin\beta\cos\beta$$

$$c_3 = \frac{I_1 + I_2 + m_2b_0}{k_m} k_3\sin\beta + \frac{m_2\sin\beta}{2k_m}[b_2k_2 + b_5k_2 + b_6k_3] -$$

$$\frac{m_2k_3\sin\beta\cos^2\beta}{4k_m\omega_2^4}\left( k_2^2 + \frac{k_3^2}{8} \right) - \frac{k_3}{4\omega_2^2}\sin\beta$$

$$c_4 = \frac{k_2\sin\beta}{2k_m}\left[ b_1m_2 - (r_0 - l)\frac{k_2}{\omega_2^2}\cos\beta \right]$$

$$c_5 = \frac{m_2\sin\beta}{2k_m}[b_3k_2 + b_1k_3] - (r_0 - l)\frac{k_2k_3}{2\omega_2^2}\sin\beta\cos\beta$$

$$c_6 = \frac{m_2\sin\beta}{2k_m}[b_3k_2 + b_2k_3]$$

$$c_7 = \frac{m_2k_2\sin\beta}{2k_m}\left[ b_4 + \frac{k_2^2}{\omega_2^2}\cos^2\beta \right]$$

$$c_8 = \frac{b_3m_2k_3\sin\beta}{2k_m} - (r_0 - l)\frac{k_3^3}{8\omega_2^2}\sin\beta\cos\beta$$

$$c_9 = \frac{m_2\sin\beta}{2k_m}\left[ b_5k_2 + b_4k_3 + \frac{5k_2^2k_3}{4\omega_2^4}\cos^2\beta \right]$$

-continued $$c_{10} = \frac{m_2\sin\beta}{2k_m}\left[b_6k_2 + b_5k_3 + \frac{k_2k_3^2}{2\omega_2^4}\cos^2\beta\right]$$

$$c_{11} = \frac{m_2k_3\sin\beta}{2k_m}\left[b_6 + \frac{k_3^2}{16\omega_2^4}\cos^2\beta\right]$$

where $b_i$, $i=1, 2, \ldots, 6$ are as given below. In the above equations, the joint velocities at the end of the first stage of motion are neglected.

$$b_0 = \frac{k_2^2}{2\omega_2^4}\cos^2\beta + \frac{k_3^2}{32\omega_2^4}\cos^2\beta + (r_0 - l)^2$$

$$b_1 = -(r_0 - l)\frac{k_2}{\omega_2^4}\cos\beta$$

$$b_2 = \frac{k_2k_3}{4\omega_2^4}\cos^2\beta = b_5$$

$$b_3 = -(r_0 - l)\frac{k_2}{4\omega_2^4}\cos\beta$$

$$b_4 = \frac{k_2^2}{2\omega_2^4}\cos^2\beta$$

$$b_6 = \frac{k_3^2}{32\omega_2^4}\cos^2\beta$$

The motor velocity and acceleration, $\dot{\Theta}_m$ and $\ddot{\Theta}_m$, are found differentiating equation (36) with respect to time.

For this stage of motion, the inverse dynamics equations are obtained by substituting the second stage motor position, equation (36), and its second time derivative, $\ddot{\Theta}_m$, and $r$, $\dot{r}$, $\Theta_l$, and $\dot{\Theta}_l$, equation (35), into equations (27b) and (27c).

Now by matching the positions and velocities at the end of the first stage of motion (i.e., $t=t_1$ in equations (30)-(32)), and at the start of the second stage of motion (i.e., $t=0$ in equations (35a) and (35b), and equation (36) and its time derivative), four relationships are obtained. Three more relationships are obtained by setting $\Theta_l=\Theta_m$, $\Theta_m=0$, and $\dot{\Theta}_l=0$ (or $r=0$) at some time $t=t_2$ in equation (36) and its time derivative, and in equation (35). The latter relationships must be satisfied so that at the completion of the second stage of motion, all velocities are zero, and no potential energy is stored in the spring element. Using the obtained relationships (a total number of seven relationships), and given the starting and ending points on the path of motion, the nine trajectory parameters ($\omega_1$, $\omega_2$, $t_1$, $t_2$, $\delta_1$, $\delta_2$, $k_1$, $k_2$, and $k_3$) can be calculated. Note that there are more trajectory parameters than constraint relationships. Therefore, one can use some criterion for selecting the desired set of parameters.

Robot Controller Structure of the Present Invention Using The Trajectory Pattern Inverse Dynamics Models In this section, the application of the derived inverse dynamics models to tracking control of robot manipulators s described. The models are in the general form $$\tau = Cv \quad (37)$$

where v is an $l \times 1$ vector with elements that consist of the sinusoidal time function of the basis trajectory and its harmonics, C is an $m \times 1$ coefficient matrix, and $\tau$ is the $m \times 1$ vector of the actuator torques. It should be noted that the time dependent terms appear only in the vector v, and that during motion, the matrix C stays constant.

A method for controlling the trajectory of a robot manipulator or the like, in accordance with the present invention, includes the steps of selecting a trajectory pattern which corresponds to a desired trajectory which the robot manipulator or the like is to follow. The trajectory pattern is in the form of a sinusoidal time function and a selected number of its harmonics. The desired trajectory has a starting point and an ending point, as described previously. Each of the starting point and ending point has associated with it position data, velocity data and acceleration data.

The position data, velocity data and acceleration data associated with each of the starting point and ending point is provided to a computational device, such as a computer or a microprocessor. In addition, data identifying the selected trajectory pattern is provided to the computational device.

The method further includes the step of calculating off-line in the computational device predetermined constants associated with a trajectory synthesizer and predetermined coefficients associated with a constant matrix gain stage. The constants and coefficients calculated by the computational device are based on the selected trajectory pattern identifying data and the position data, velocity data and acceleration data associated with the starting and ending points.

The method further includes the step of generating a sinusoidal time-varying signal and selected harmonic signals corresponding to the sinusoidal time-varying signal. These signals are based on the selected trajectory pattern and respectively correspond to the sinusoidal time function and the selected number of harmonics of the sinusoidal time function.

The sinusoidal signal and the harmonic signals are provided to the trajectory synthesizer and the constant matrix gain stage. The trajectory synthesizer provides a desired position vector signal and a desired velocity vector signal as output signals from it. The constant matrix gain stage provides a feedforward torque vector signal as an output signal from it.

An actual position vector signal provided by the robot manipulator or the like is subtracted from the desired position vector signal and the result of this subtraction is a position error vector signal.

An actual velocity vector signal provided by the robot manipulator or the like is subtracted from the desired velocity vector signal and the result of this subtraction is a velocity error vector signal.

The position error vector signal is provided to a first gain stage to amplify the signal. The output of the first gain stage provides an amplified position error vector signal. Similarly, the velocity error vector signal is provided to a second gain stage so that it is amplified. The output of the second gain stage provides an amplified velocity error vector signal.

The amplified position error vector signal, the amplified velocity error vector signal and the feed-forward torque vector signal are provided to an adder so that they can be added together. The output of the adder provides an actuation vector signal corresponding to the addition of these three signals to drive the robot manipulator or the like.

The structure of a controller formed in accordance with the present invention and utilizing the inverse dynamics models described previously is shown in the block diagram of FIG. 7.

The apparatus of the present invention basically includes an inverse dynamics based controller 10. The controller 10 includes a function or signal generator or the like 12 for generating signals corresponding to the sinusoidal time functions of the basis trajectory and its harmonics. The signals are provided to a trajectory synthesizer 14 which generates the desired joint position and velocity vector signals using the sinusoidal and harmonic signals and the constant trajectory parameters of the trajectory synthesizer 14.

A constant matrix gain stage 16 multiplies the sinusoidal and harmonic signals by fixed gains (i.e., the coefficients of the matrix) to provide the robot actuator torque (i.e., the feedforward torque vector signal).

A computer, microprocessor or the like 18 is also provided. The matrix coefficients of the constant matrix gain stage 16, the frequency of the fundamental of the sinusoidal function and its corresponding signals and the constants of the trajectory synthesizer 14 are calculated by the computer 18 and set.

The controller may also include an outer loop feedback control circuit to correct for model inaccuracies and noise. More specifically, the desired joint position and velocity vector signals are respectively provided to the positive (+) inputs of first and second subtractors 20, 22. The output of the first subtractor 20 is provided to the input of a first gain stage 24, and the output of the second subtractor 22 is provided to the input of a second gain stage 26. The outputs of the first and second gain stages 24, 26 are provided to an adder 28. The adder 28 is a three input device which receives the amplified output signals of the first and second subtractors 20, 22 as well as the output of the constant matrix gain stage 16. The output of the adder 28 is provided to the robot manipulator 30.

Sensors on the robot manipulator 30 provide actual position and velocity vector signals. The actual position and velocity vector signals are respectively provided to the negative (−) inputs of the first and second subtractors 20, 22. The actual signals are subtracted from the desired signals, and a position error vector signal and a velocity error vector signal as a result of this subtraction are provided on the output of the first and second subtractors 20, 22, respectively. These error signals are multiplied by the first and second gain stages 24, 26.

The gross motion torque signals are seen to be readily generated using the sinusoidal time function of the basis trajectory and its harmonics, and the constant matrix C. The desired joint positions and velocities are generated using the sinusoidal time functions and the constant trajectory parameters in the trajectory synthesizer. The model is used to construct a tracking controller with an outer loop PD control action to correct for model inaccuracies and noise.

It should be noted that one can construct a "universal controller" in accordance with the present invention, using analog and/or digital components. In this device, the appropriate fundamental sinusoidal time function and its harmonics are generated. For each particular class of inverse dynamics models, the required sinusoidal functions are then selected, and multiplied by the fixed gains (corresponding to the values of the constant matrix C gain stage). The elements of the matrix C, constant trajectory parameters, and the frequency of the fundamental sinusoidal function, are calculated by the computer and set. The computer will also send the appropriate signals to set appropriate coefficient and number of harmonics in order to construct the required inverse dynamics models.

Figure 7:
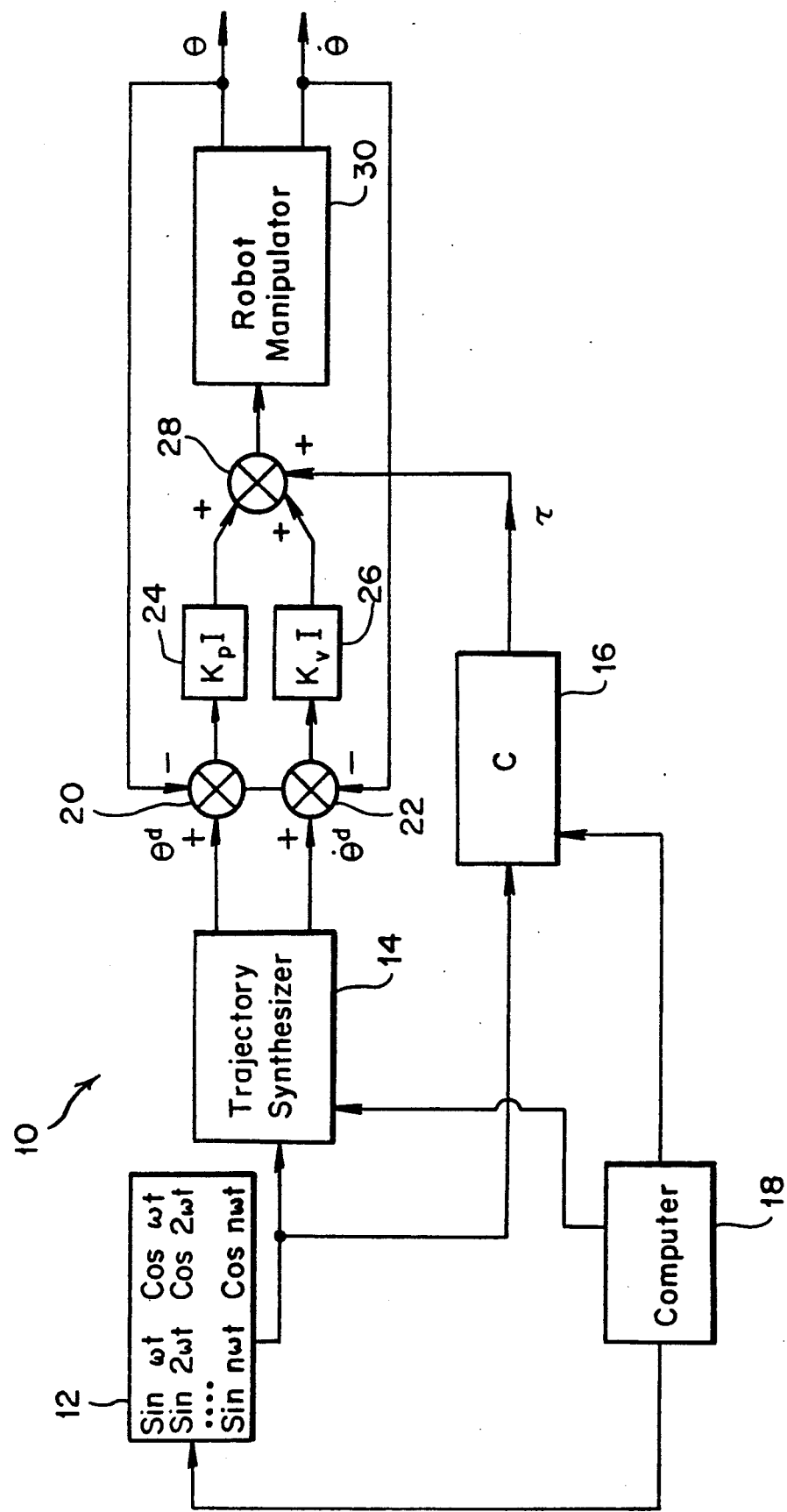
FIG. 7 is a block diagram of a robot manipulator controller formed in accordance with the present invention.

Inverse Dynamics Based Tracking Controllers for Trajectory Patterns I and II For the RP manipulator described previously which follows trajectory patterns I or II, an inverse dynamics based controller, as shown in FIG. 7, having a PD outer loop corrective action, may be formed in accordance with the present invention. The desired trajectory is formed using the input signals (i.e., the sinusoidal time function of the basis trajectory and its harmonics) and the trajectory constants within the "trajectory synthesizer" block, as shown in FIG. 7. The gross motion torque component for each joint is determined using the input signals and the constant matrix C. The joint motor torque limits are considered to be $$-10\ N-m \leq \tau \leq 10\ N-m$$

$$-8\ N \leq f \leq 8\ N$$

Figure 8A:
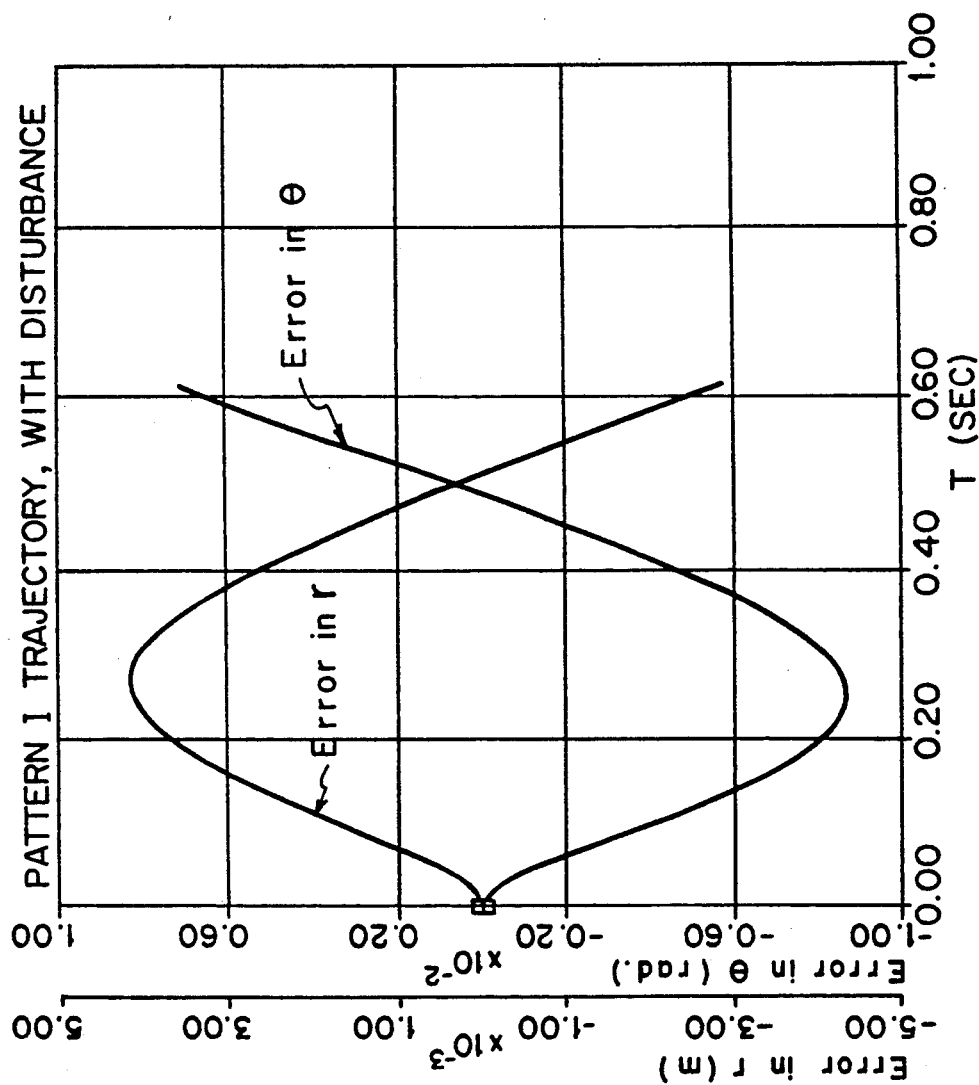
FIGS. 8(a) and 8(b) respectively are graphs of the simulation results of the joint position and joint velocity errors of a robot manipulator following a first trajectory pattern in the presence of a disturbance.
Figure 8B:
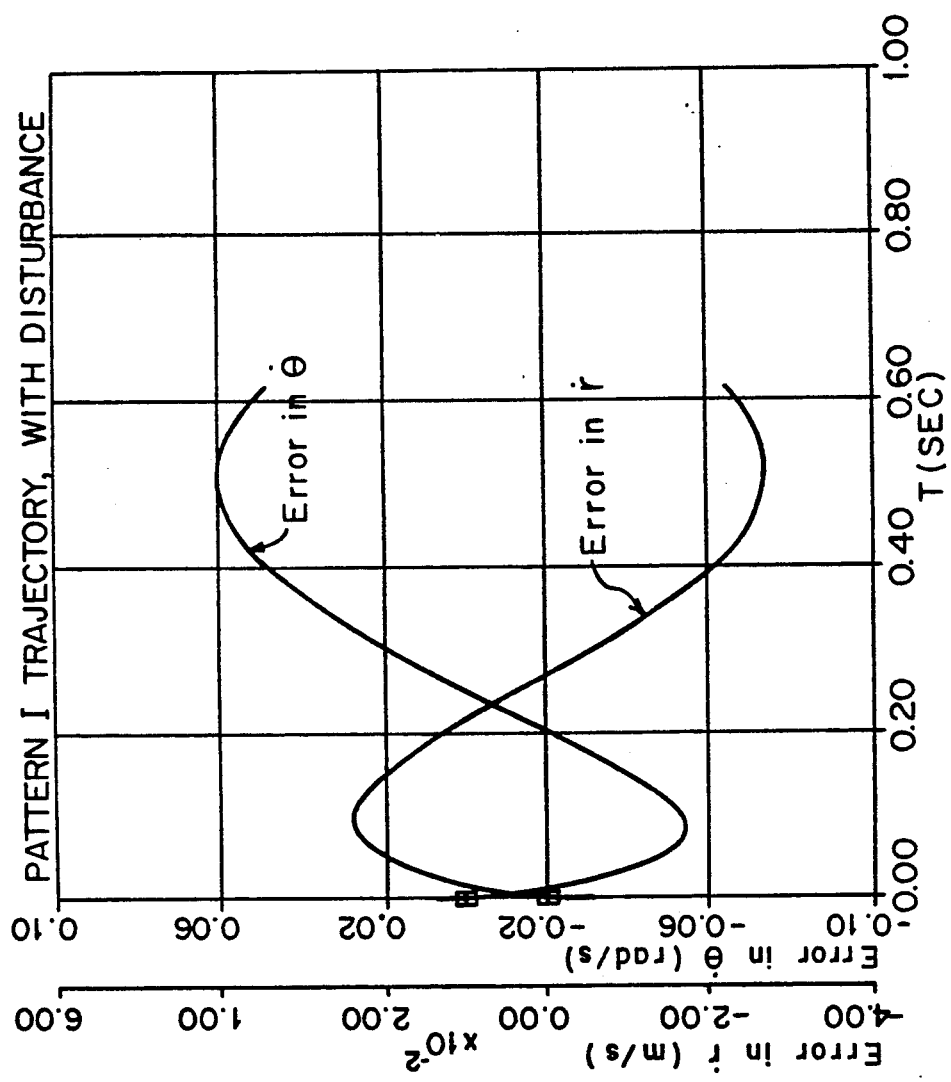
Figure 9A:
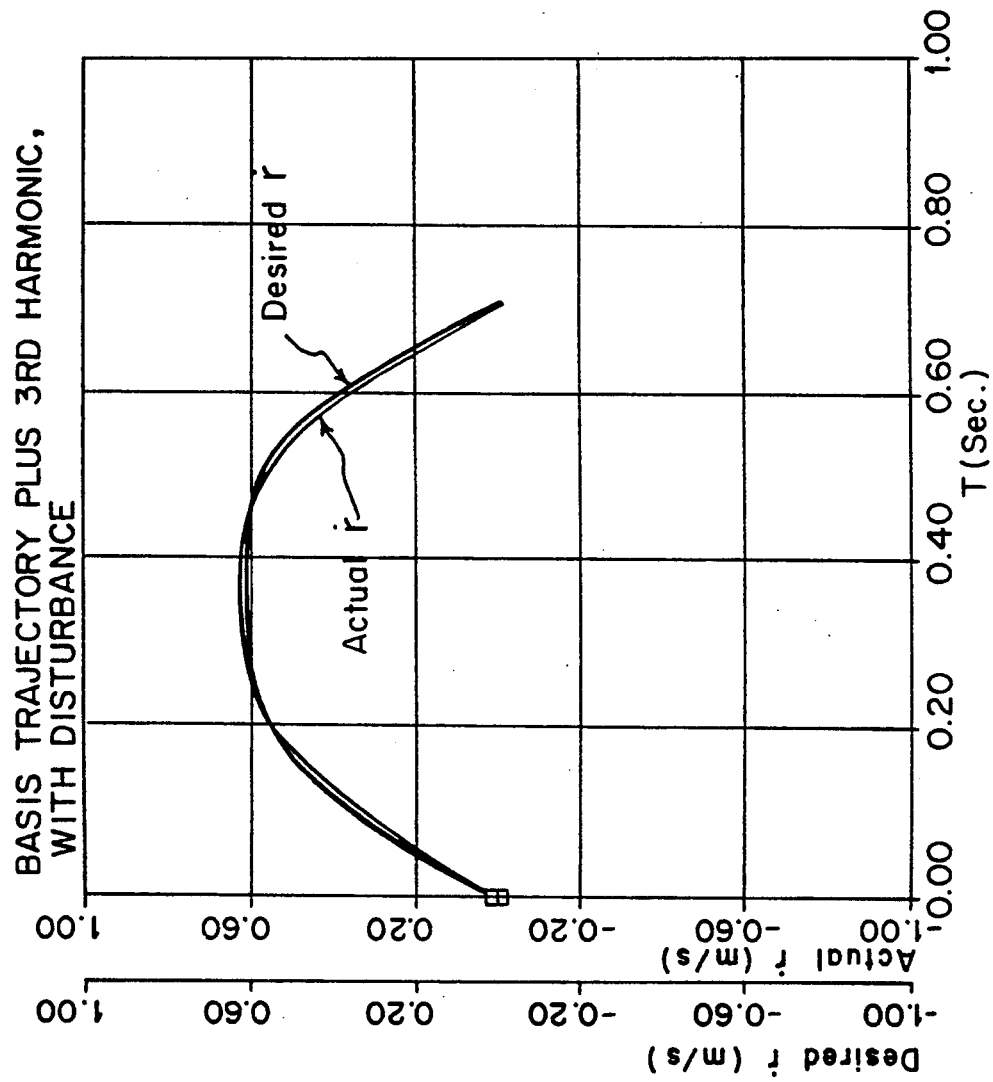
Figure 9D:
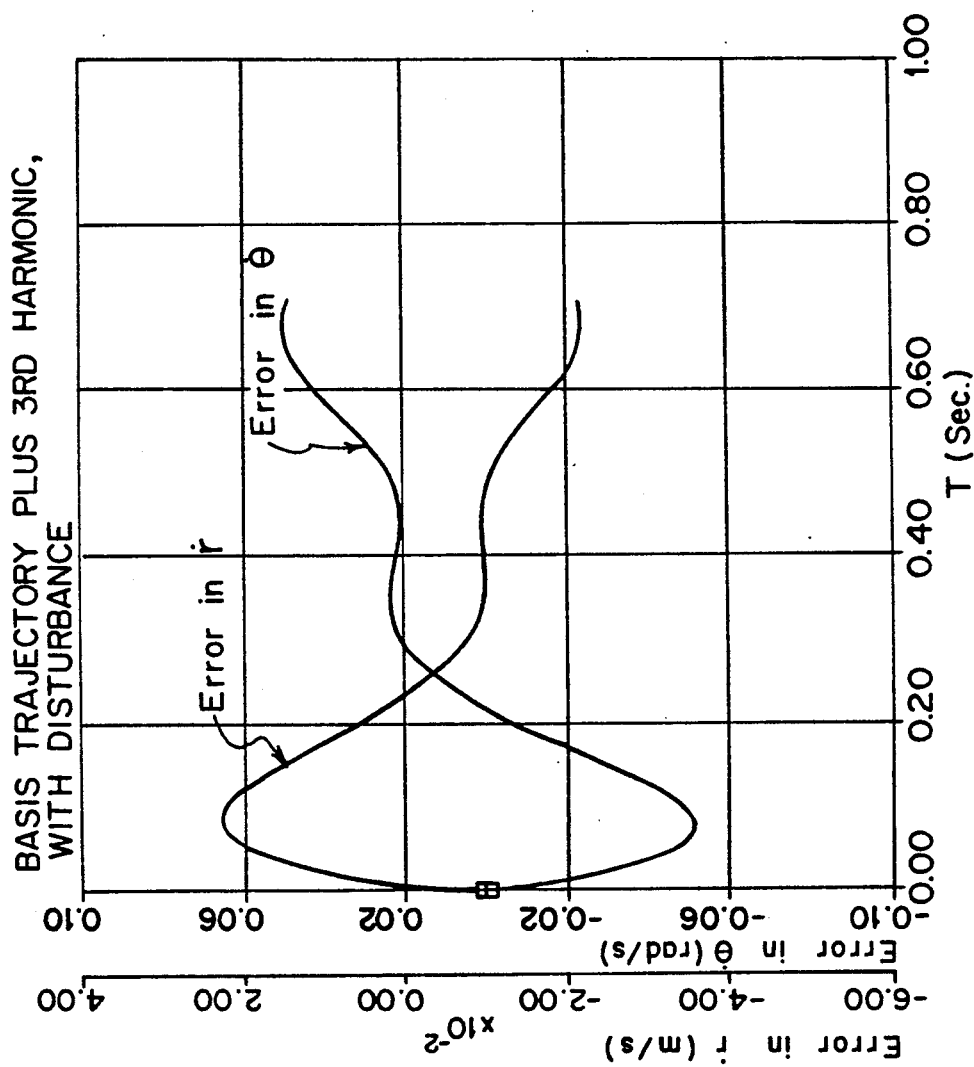

The inertia parameters are assumed to be $I_1 = I_2 = 0.5$ kg$-$m$^2$, $m_2 = 1.0$ kg, and $l = 0.5$ m. The controller gain matrices are chosen to be $k_p = 100\ I$ and $K_v = 20\ I$. It is obvious that the tracking is perfect in the absence of any disturbance or noise. To show the performance of the controller in the presence of a disturbance, let $m_2$ be increased by 20 percent, to represent, for example, the effects of carrying a payload. The simulation results (joint position and velocity errors) with the trajectory pattern I and in the presence of the above disturbance are shown in FIGS. 8(a) and 8(b).

The simulation results (the joint velocity profiles, and the position and velocity errors), for tracking the above path with a pattern II trajectory are shown in FIGS. 9(a), 9(b), 9(c) and 9(d). The results correspond to the case where a disturbance equal to 20 percent of $m_2$ is present. As can be seen from the simulation results, the velocity of the pattern II trajectory approaches a trapezoidal profile. It is worth noting that the velocity profile can be made to approximate a trapezoidal function more closely by selecting a trajectory with a larger number of harmonics. However, this will lead to inverse dynamics classes containing even higher harmonic components, to which the system may not be capable of responding.

Inverse Dynamics Based Tracking Controllers of the Present Invention With Learning Capability and Calibration The robot tracking controller of the present invention is capable of learning the desired trajectory after a number of practice runs. For example, consider the RP manipulator described previously in connection with the pattern II trajectory. In this example, it is assumed that only the structure of the inverse dynamics model, equation (24), is known, and that no a priori information about the model coefficients is available. A controller with the structure shown in FIG. 7 is used. With the method described herein, it can be seen that the model coefficients can be learned through practice for each particular trajectory.

In the first learning run, no feedforward torque is present, and the only corrective torque signals are those provided through the position and velocity feedback loops. The tracking performance is obviously poor. During the motion, the actuator torque levels are measured at a number of discrete points in time. These measurements are substituted into the model equations. The coefficient values are then computed by solving a set of linear equations. The new coefficient values are then used in the next learning run. This constitutes the learning process, and the performance will improve as the number of learning runs is increased (i.e., through practice). In FIG. 10, the improvement in the tracking performance of the controller as the number of practice runs is increased is shown. The performance index considered is the mean norm of the sum of the joint position and velocity errors. As can be seen, the performance index improves by 92% after 30 practice runs.

If the system parameters are not known accurately, the coefficients identified through the learning process can be used in conjunction with their describing equations to determine better estimates of their true values. This provides an algorithm that can be used to calibrate the model parameters.

The control method of the present invention has all the well known advantages of the conventional inverse dynamics based controllers. However, the present method does not have the main drawback of the currently available model based controllers, namely, the excessive computational requirements, since it requires no real time computations in the control loop. This is the case since the exact compensation of the manipulator non-linearities is possible with no real time inverse kinematics and dynamics computations. For a particular trajectory, the constants appearing in the inverse dynamics model are computed off-line before the motion begins.

As mentioned previously, the second drawback of the presently available model based controllers is the high sensitivity to the inaccuracies in the model parameters. The trajectory pattern method of the present invention, however, provides the basis for the development of learning and calibration algorithms that can be used to identify and upgrade the dynamic models of the system.

The structure of the inverse dynamics model controller of the present invention is such that it permits the use of analog or digital electronic components for its construction. This is the case since for each trajectory pattern, the inverse dynamics equations have a fixed structure. For each particular trajectory, one only needs to set the values of its constants. For different patterns, appropriate coefficients and number of harmonics are set by the computer of the present invention, thus resulting in a universal controller that can be used for the control of any robot manipulator.

An off-line computation and storage (i.e., scheduling) mode of operation can also be adopted, where the coefficients for a large number of trajectories are precomputed and stored for use in real time through table look-up. In this mode, the memory requirement of the present method is minimal, since for each trajectory only the inverse dynamics model coefficients are stored. This is in sharp contrast with the scheduling algorithms of conventional controllers, where the torque levels for each sample time must be calculated off-line and stored. The latter will obviously have prohibitive memory requirements when the information for a large number of trajectories is to be stored.

In the present method, the off-line computation time is minimal due to the fact that only a limited number of coefficients need to be calculated. It is worth noting that in the expressions describing the model coefficients, only a limited number of parameters vary from one trajectory to another. The parameters are the amplitudes of the sinusoidal terms present in the trajectory, the period of the sinusoidal time function of the basis trajectory, path dependent parameters, and the starting point coordinate information.

In the process of deriving the inverse dynamics equations, the terms that result in higher harmonics can be eliminated in order to reduce the remaining algebraic manipulations. Note that the inclusion of frequencies to which the system does not have an appreciable response, does not serve any meaningful purpose and does not affect the performance of the control system. Therefore, the method of the present invention provides a systematic approach to model approximation, leading to models in which only the ineffective components are neglected.

The developed inverse dynamics models reveal the inherent characteristics of the nonlinear manipulator system through the number of harmonics that are present in the model equations for a given pattern. This provides a systematic approach to trajectory synthesis. For example, the harmonic content of a trajectory may be selected as a criterion for trajectory planning, providing an effective trajectory synthesis tool. This might, for example, be warranted from the vibration and control points of view.

Another application of the controller of the present invention is as a regulator. Regulators are widely used to keep a system output constant in spite of disturbances entering the system. In general, the trajectory with which the regulation is effected is not predetermined, however, and it is desirable for the regulator to have a fast response.

In this application, at regular time intervals, a selected trajectory pattern is used to plan the motion from the initial or current state of the system to the final or fixed state. The corresponding inverse dynamics models are then used to construct a regulator similar to that described for the tracking controller. The trajectory pattern can be chosen considering the desired speed of response and vibration characteristics of the system.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A method for trajectory control of a robot-like device, which comprises the steps of:

selecting a trajectory pattern which corresponds to a desired trajectory which the robot-like device is to follow, the trajectory pattern being in the form of a sinusoidal time function and a selected number of its harmonics, the desired trajectory having a starting point and an ending point, each of the starting point and ending point having associated therewith position data, velocity data and acceleration data;

providing the position data, velocity data and acceleration data associated with each of the starting point and the ending point to a computational device and further providing data identifying the selected trajectory pattern to the computational device;

calculating off-line in the computational device predetermined constants associated with a trajectory synthesizer and predetermine coefficients associated with a constant matrix gain stage based on the selected trajectory pattern identifying data and the position data, velocity data and acceleration data associated with the starting and ending points;

generating a sinusoidal time-varying signal and selected harmonic signals based on the selected trajectory pattern and respectively corresponding to the sinusoidal time function and the selected number of harmonics of the sinusoidal time functions;

providing the sinusoidal signal and the harmonic signals to the trajectory synthesizer and the constant matrix gain stage, the trajectory synthesizer providing a desired position vector signal and a desired velocity vector signal as output signals therefrom, the constant matrix gain stage providing a feedforward torque vector signal as an output signal therefrom;

subtracting an actual position vector signal providing by the robot-like device from the desired position vector signal, and providing a position error vector signal corresponding thereto;

subtracting an actual velocity vector signal provided by the robot-like device from the desired velocity vector signal, and providing a velocity error vector signal corresponding thereto;

amplifying the position error vector signal and providing an amplified position error vector signal corresponding thereto;

amplifying the velocity error vector signal and providing an amplified velocity error vector signal corresponding thereto; and adding together the amplified position error vector signal, the amplified velocity error vector signal and the feedforward torque vector signal and providing an actuation vector signal corresponding thereto to drive the robot-like device.

2. Apparatus for trajectory control of a robot-like device, which comprises:

a signal generator, the signal generator generating a sinusoidal time-varying signal and selected harmonic signals, the sinusoidal time-varying signal and the selected harmonic signals corresponding to a sinusoidal time function and selected harmonics of the sinusoidal time function of a trajectory pattern which corresponds to a desired trajectory which the robot-like device is to follow;

a trajectory synthesizer, the trajectory synthesizer receiving the sinusoidal time-varying signal and the selected harmonic signals of the sinusoidal signal and providing a desired position vector signal and a desired velocity vector signal as output signals therefrom;

a constant matrix gain stage, the constant matrix gain stage receiving the sinusoidal time-varying signal and the harmonic signals and providing a feedforward torque vector signal as an output signal therefrom;

a computational device, the computational device being coupled to the signal generator, the trajectory synthesizer and the constant matrix gain stage;

a first subtractor, the first subtractor receiving the desired position vector signal and an actual position vector signal provided by the robot-like device and subtracting the actual position vector signal from the desired position vector signal, and providing a position error vector signal corresponding thereto as an output signal therefrom;

a second subtractor, the second subtractor receiving the desired velocity vector signal and an actual velocity vector signal provided by the robot-like device and subtracting the actual velocity vector signal from the desired velocity vector signal, and providing a velocity error vector signal corresponding thereto as an output signal therefrom;

a first gain stage, the first gain stage receiving the position error vector signal and providing an amplified position error vector signal corresponding thereto as an output signal therefrom;

a second gain stage, the second gain stage receiving the velocity error vector signal and providing an amplified velocity error vector signal corresponding thereto as an output signal therefrom; and an adder, the adder receiving the amplified position error vector signal, the amplified velocity error vector signal and the feedforward torque vector signal, and providing an actuation vector signal corresponding thereto as an output therefrom to drive the robot-like device.

* * * * *